United States Patent
Roussel

(10) Patent No.: US 11,727,176 B2
(45) Date of Patent: *Aug. 15, 2023

(54) METHODS FOR SHUT-IN PRESSURE ESCALATION ANALYSIS

(71) Applicant: ConocoPhillips Company, Houston, TX (US)

(72) Inventor: Nicolas P. Roussel, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,269

(22) Filed: Feb. 15, 2022

(65) Prior Publication Data

US 2022/0215156 A1 Jul. 7, 2022

Related U.S. Application Data

(63) Continuation of application No. 16/989,779, filed on Aug. 6, 2020, now Pat. No. 11,280,165, which is a
(Continued)

(51) Int. Cl.
*G06F 30/28* (2020.01)
*E21B 41/00* (2006.01)
(Continued)

(52) U.S. Cl.
CPC .............. *G06F 30/28* (2020.01); *E21B 41/00* (2013.01); *E21B 43/26* (2013.01); *E21B 47/06* (2013.01);
(Continued)

(58) Field of Classification Search
CPC ...... E21B 41/0092; E21B 41/00; E21B 43/26; E21B 47/06; E21B 49/00; E21B 43/267
See application file for complete search history.

(56) References Cited

U.S. PATENT DOCUMENTS

| 4,858,130 A | 8/1989 | Widrow |
| 5,005,643 A | 4/1991 | Soliman et al. |

(Continued)

FOREIGN PATENT DOCUMENTS

| EP | 2163724 A2 | 3/2010 |
| WO | 2005124395 2 | 12/2005 |

(Continued)

OTHER PUBLICATIONS

Daneshy, A.; Au-Yeung, J.; Thompson, T.; Tymko, D. "Fracture shadowing: A direct method of determining of the reach and propagation pattern of hydraulic fractures in horizontal wells." (2012) Paper for presentation at the SPE Hydraulic Fracturing Technical Conference, Woodlands, TX, USA.

(Continued)

*Primary Examiner* — Caroline N Butcher
(74) *Attorney, Agent, or Firm* — Boulware & Valoir

(57) ABSTRACT

Methods for using shut-in pressures to determine uncertainties in a hydraulic fracturing process in a shale reservoir are described. Data commonly collected during multistage fracturing is used to calculate propped fracture height and induced stresses, as well as other variables, in the presence of horizontal stress anisotropy. These variables can then be incorporated into reservoir simulations to perform fracturing monitoring, forecast hydrocarbon recoveries, or modify fracturing plans.

18 Claims, 10 Drawing Sheets

Related U.S. Application Data continuation of application No. 15/823,762, filed on Nov. 28, 2017, now Pat. No. 10,753,181.

(60) Provisional application No. 62/427,262, filed on Nov. 29, 2016.

(51) Int. Cl.

| | |
|---|---|
| *H04L 9/32* | (2006.01) |
| *E21B 43/26* | (2006.01) |
| *E21B 47/06* | (2012.01) |
| *E21B 49/00* | (2006.01) |
| *E21B 43/267* | (2006.01) |
| *G01V 99/00* | (2009.01) |
| *G06F 40/205* | (2020.01) |
| *G06F 40/143* | (2020.01) |
| *G06F 40/117* | (2020.01) |

(52) U.S. Cl.
CPC ............ *E21B 49/00* (2013.01); *G06F 40/117* (2020.01); *G06F 40/143* (2020.01); *G06F 40/205* (2020.01); *H04L 9/3247* (2013.01); *E21B 43/267* (2013.01); *G01V 99/005* (2013.01); *H04L 2209/60* (2013.01)

(56) References Cited

U.S. PATENT DOCUMENTS

| | | |
|---|---|---|
| 7,114,561 B2 | 10/2006 | Vinegar et al. |
| 7,272,973 B2 | 9/2007 | Craig |
| 7,543,635 B2 | 6/2009 | East et al. |
| 7,788,037 B2 | 8/2010 | Soliman et al. |
| 7,933,718 B2 | 4/2011 | McDaniel et al. |
| 8,204,727 B2 | 6/2012 | Dean et al. |
| 8,521,494 B2 | 8/2013 | Narr et al. |
| 8,839,873 B2 | 9/2014 | Johnson et al. |
| 8,938,363 B2 | 1/2015 | Beasley et al. |
| 9,023,770 B2 | 5/2015 | Todd et al. |
| 9,262,713 B2 * | 2/2016 | Shelley ............... G06N 3/0427 |
| 9,575,206 B2 | 2/2017 | Guo |
| 9,835,017 B2 | 12/2017 | Taylor |
| 9,926,776 B2 | 3/2018 | Zha et al. |
| 10,120,343 B2 | 11/2018 | Chiu et al. |
| 10,724,359 B2 | 7/2020 | Anno et al. |
| 11,209,558 B2 | 12/2021 | Roussel |
| 2013/0211807 A1 | 8/2013 | Templeton-Barrett et al. |
| 2016/0003020 A1 * | 1/2016 | Sharma ............... E21B 49/006 |
| | | 166/308.1 |
| 2017/0114613 A1 * | 4/2017 | Lecerf ................... G06Q 10/06 |
| 2017/0211371 A1 * | 7/2017 | Brady ...................... G01L 1/16 |
| 2019/0346579 A1 | 11/2019 | Roussel et al. |

FOREIGN PATENT DOCUMENTS

| | | | |
|---|---|---|---|
| WO | 2011022012 A1 | 2/2011 | |
| WO | 2012173608 A1 | 12/2012 | |
| WO | 2013008195 A2 | 1/2013 | |
| WO | 2014126484 A1 | 8/2014 | |
| WO | WO-2016175844 A1 * | 11/2016 | ............ E21B 43/26 |
| WO | 2016193733 A1 | 12/2016 | |

OTHER PUBLICATIONS

Escobar, H. F.; Castro, J. R.; Mosquera, J. S. "Rate-transient analysis for hydraulically fractured vertical oil and gas wells," (2014) Asian Research Publishing Network (ARPN) Journal of Engineering and Applied Sciences, vol. 9, No. 5, 739-749.

* cited by examiner

METHODS FOR SHUT-IN PRESSURE ESCALATION ANALYSIS

PRIOR RELATED APPLICATIONS

This application is a continuation of U.S. Ser. No. 16/986,779 (allowed), filed on Aug. 6, 2020, which is a continuation of U.S. Ser. No. 15/823,762 (U.S. Pat. No. 10,753,181), filed on Nov. 28, 2017, which claims priority to U.S. Ser. No. 62/427,262, filed Nov. 29, 2016. Each are expressly incorporated by reference herein in their entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure generally relates to improvements to hydraulic fracturing treatment of oil-containing reservoirs. Specifically, methods of evaluating hydraulic fractures using shut-in pressures are disclosed.

BACKGROUND OF THE DISCLOSURE

Unconventional hydrocarbon reservoirs are any reservoir that requires special recovery operations outside the conventional operating practices. Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material of an e.g. shale formation.

The rapid development of extracting hydrocarbons from these unconventional reservoirs can be tied to the combination of horizontal drilling and induced fracturing (called "hydraulic fracturing" or simply "fracking" or "frac'ing") of the formations. Horizontal drilling has allowed for drilling along and within hydrocarbon reservoirs of a formation to better capture the hydrocarbons trapped within the reservoirs. Additionally, increasing the number of fractures in the formation and/or increasing the size of existing fractures through fracking may increase hydrocarbon recovery.

In a typical hydraulic fracturing treatment, fracturing treatment fluid containing a proppant material is pumped downhole into the formation at a pressure sufficiently high enough to cause fracturing of the formation or enlargement of existing fractures in the reservoir. Proppant material remains in the fracture after the treatment is completed, where it serves to hold the fracture open, thereby enhancing the ability of fluids to migrate from the formation to the well bore through the fracture. The spacing between fractures as well as the ability to stimulate the fractures naturally present in the rock may be major factors in the success of horizontal completions in unconventional hydrocarbon reservoirs.

While there are a great many fracking techniques, one useful one is "plug-and-perf" fracking. Plug-and-perf completions are extremely flexible multistage well completion techniques for cased hole wells. Each stage can be perforated and treated optimally because options can be exercised up to the moment the perforating gun is fired. The engineer can apply knowledge from each previous stage to optimize treatment of the current stage.

The process consists of pumping a plug-and-perforating gun to a given depth. The plug is set, the zone perforated, and the tools removed from the well. A ball is pumped downhole to isolate the zones below the plug and the fracture stimulation treatment is pumped in. The ball-activated plug diverts fracture fluids through the perforations into the formation. After the stage is completed, the next plug and set of perforations are initiated, and the process is repeated moving further along the well.

Improvements in hydrocarbon recovery with fracking depend on fracture trajectories, net pressures, and spacing. Thus, the ability to monitor the geometry of the induced fractures to obtain optimal placement and stimulation is paramount. An induced fracture may be divided into three different regions (hydraulic, propped, and effective), but out of the three fracture dimensions, only the last one is relevant to a reservoir model, and may be used to forecast future production.

One common way of evaluating the geometry of hydraulic fractures during well stimulation is through microseismic measurements. However, this method has a few disadvantages. First, it is an indirect method, as microseismicity captures the shear failure of well stimulation, but not tensile opening of the hydraulic fracture itself. In addition, the physical meaning of microseismic events and how they relate to the hydraulic fracture is still widely debated in the literature. Further, the method is subject to a significant uncertainty in the location of the microseismic events.

Another common method used in industry is pressure-transient analysis or "PTA". But, this method often leads to a wide range of potential fracture geometries.

PTA, Rate Transient Analysis or "RTA" and numerical modeling are widely used techniques to characterize effective fracture dimensions and fracture conductivity. Unfortunately, as these methods analyze the combined contribution of all induced fractures and rely on simplistic assumptions of the induced fracture system, they often lead to non-unique solutions and require additional data to further constrain the range of potential outcomes.

All of current methods used to estimate fracture dimensions and horizontal stresses can only be applied on a limited number of wells because of the significant incremental cost (procedure and additional equipment) or the time/effort required to complete the assessment.

Thus, what is needed in the art are improved methods of evaluating the hydraulic fracturing for every well being hydraulically stimulated. Although hydraulic fracturing is quite successful, even incremental improvements in technology can mean the difference between cost effective production and reserves that are uneconomical to produce.

SUMMARY OF THE DISCLOSURE

Disclosed herein are methods for evaluating the hydraulic fracturing for every well being hydraulically stimulated, optimize the fracturing program based on the evaluations, and implementing the modifications at the wellsite. Specifically, the methods estimate some of the most important uncertainties associated with hydraulic fracturing in each stage, especially in shale reservoirs: 1) hydraulic-fracture height, length and induced fracture area; and, 2) in-situ horizontal-stress anisotropy ($\sigma_{hmax}-\sigma_{hmin}$) and adjust the fracturing program accordingly on subsequent stages and/or similar wellsites.

Knowledge of the horizontal-stress anisotropy is critical for many aspects of the design of multistage completions and field development. A low value of the horizontal-stress anisotropy may be a limiting factor in the ability to space down perforation clusters, as fracture reorientation may take place. The impact may also be felt when trying to stimulate infill wells following production of one or several parent wells. Depletion will impact not only stress magnitude, but may also reorient stresses in the field, such that the propagation direction of fractures initiated from an infill well may differ from the preferable transverse direction. Operationally, it may impact the spacing of perforations clusters, the sequencing of multi-well fracturing operations, as well as the timing and design of infill and refracturing operations. The present methods can be used to determine if fracturing reorientation is likely to be occurring.

If fracturing reorientation is not occurring, then the fracture height, length, and surface area can be estimated using the disclosed methods.

As stress induced by the completion is strongly influenced by stage and perforation cluster spacing, the method can be used in conjunction with other diagnostic methods to help guide completion optimization, especially in the early appraisal phase.

In its most basic form, the evaluation steps in the method, referred to herein as the Instantaneous Shut-in Pressure (ISIP) Analysis, compares the shut-in pressure escalation for each fracturing stage with a two-parameter exponential recovery equation, the type-curves of the load-normalized stress plateau, escalation, and interference ratio, as well as the fracture-reorientation criterion, to estimate hydraulic-fracture height and horizontal-stress anisotropy.

The key parameters—hydraulic-fracture height and horizontal-stress anisotropy—can then be used to optimize completion designs in horizontal wells, including stage and perforation cluster spacing, fluid type/volume and the like, reservoir development, and/or forecasting. The user is only required to input the collected shut-in pressures and the following parameters cluster spacing, number of perforation clusters/stage, well depth and fracture closure gradient.

For certain fracturing operations, additional information such as fracture length is needed. As such, other embodiments of the method utilizes additional fracturing information such as the Young's modulus, Poisson's ratio, and slurry volume pumped for each stage to calculate to evaluate parameters such as the hydraulic-fracture length and induced fracture area.

The methods described herein take into account the connection between fracking design and in-situ stresses to determine the resulting induced fractures and stresses (geo-mechanical stress interference). Further, the methods aid in developing and executing a fracturing plan with maximal efficiencies, and thereby improve hydrocarbon recoveries.

Because every fracturing stage will contribute to a reduction in the formation's horizontal stress anisotropy, the ISIP analysis is a useful tool to guide the spacing design of perforation clusters. As a result, an ISIP analysis is a useful addition to any workflow looking to optimize well spacing and stacking in unconventional plays.

The calculations in the described methods are preferably programmed into a spreadsheet or solver software. The embodiments described here utilize Microsoft Excel due to its ease of use and industry-wide acceptance. Excel has multiple solver add-ins and can quickly perform the calculations with little user input. Thus, the methods can be used with minimal training or user input. Other exemplary software includes Numbers from Apple, Apache OpenOffice, LibreOffice and Google Sheets, as well as numerical computing environments such as MATLAB or Python.

Any method described herein can further include the step of using the results in a reservoir simulation program to predict reservoir performance characteristics, such as fracturing, production rates, total production levels, rock failures, faults, wellbore failure, optimal stage and perforation cluster spacing, and the like.

Any method described herein can also include the step of using the results to optimize and implement a hydraulic fracturing program or modify a hydraulic fracturing program or pattern for subsequent steps in a given well or wellpad. The final frack plan is thus implemented, and the well is fractured according to the final plan. The inventive methods may also include the subsequent production of hydrocarbons from the fracked well. Further, the optimized fracturing program can also be used on similar wells.

The results from the ISIP Analysis steps can be inputted into any known reservoir simulation software that is commercially available or developed in-house. Exemplary software include IMEX, GEM or Stars (CMG); VIP and Nexus (Halliburton); Mangrove, Eclipse and Intersect (Schlumberger); and FRACGEN/NFFLOW (National Energy Technology Laboratory). For shale reservoirs, FRACMAN™ and MSHALE™ may be preferred. These models can be used with appropriate plugins or modifications needed to practice the claimed methods.

One advantage of the method is that it is a fracture/stress diagnostic method that uses data that is systematically available for every well being hydraulically stimulated. This "free data" not only saves time and costs, but allows the method to be quickly implemented on site by a field completion engineer. Also, the method does not require additional field operations or downhole/surface equipment, thus saving implementation costs.

The "free data" is typically obtained following the end of injection of each fracturing stage of a plug-and-perf hydraulic stimulation, after friction forces in the wellbore, perforations and near-wellbore region dissipate. While ISIPs may be obtained during Diagnostic Fracture Injection Test (DFIT), the method described herein generally applies to ISIPs measured at the end of fracturing stages in a plug & perf completion.

The typical evolution of bottom hole pressure recorded at the end of a fracturing stage is shown in FIG. 1.

The ISIP is measured at the end of a Diagnostic Fracture Injection Test (DFIT), which has become the primary transient test for the ultra low permeability shales developed in the United States. The DFIT consists of injecting a relatively small volume of fluid at a low rate through perforations in a cemented casing to create a small-scale hydraulic fracture. The fracture propagates out past any drilling damage and allows the pressure signal during the fall off to be in contact with the reservoir matrix. DFITs may be run at different depths of a vertical wellbore to obtain multiple stress calibration points, or at the toe of a horizontal well, prior to stimulation operations. Along with closure pressure, which is equal to the minimum horizontal stress, DFITs may be used to estimate leak-off rate, reservoir pressure and permeability.

The current methods utilize the instantaneous shut-in pressure data because analysis of non-instantaneous shut-in pressure data (i.e. 3-min, 5-min shut-in pressures) will result in erroneous evaluations of the total stress induced by the completion and the hydraulic fracture height.

In more detail, the ISIP analysis consists of four basic steps:
1. Collect shut-in pressure data.
2. Match shut-in pressure data with a modified linear time invariant system.
3. Determine causes of stress plateaus.
4. Calculate fracture height, horizontal-stress anisotropy, and other variables using type-curves, based on Eq. 1, shown below, if no fracture reorientation is expected.

The ISIP is recorded at the end of each fracturing stage during DFIT and is matched with a two-parameter exponential recovery equation (EQU. 1):

$$\Delta\sigma_{shadow}(n) = \Delta\sigma_{plateau}\left(1 - e^{\frac{1-n}{Escalation}}\right) \quad \text{Equ. 1}$$

In EQU. 1, n is the stage number, $\Delta\sigma_{plateau}$ represents the total value of stress interference that is produced by the stimulation and $\Delta\sigma_{shadow}$ is the stress interference contribution that increases with each new fracturing stage.

This equation is a typical first-order, linear time invariant system; however, the time constant has been replaced with the escalation number because it is the key parameter for characterizing the dynamic response of the fracturing. The escalation number represents how "quickly" stress interference approaches the plateau. More specifically, it represents the number of fracturing stages necessary for induced stresses to reach some arbitrary percentage of the stress plateau.

The induced stresses will never reach 100% of the stress plateau due to the natural logarithm in the equation. Hence, in order to quantify how fast ISIPs converge toward the plateau, a smaller percentage target must be chosen. The value that simplifies the formulation of the stress-escalation equation (EQU. 1) is 1-1/e, or 63.2%. This value is commonly used with linear time invariant systems in other applications of the exponential recovery equation in physics and engineering. The number of stages required to reach 63.2% of the stress plateau is called the Escalation number (EQU. 1).

In matching Equation 1 and the ISIP data, the most straightforward solution consists in minimizing the squared differences between the data and match (least-squares method). In Excel, and other spreadsheet programs, optimization solvers or add-ins can be used to process multiple iterations where the two parameters, stress plateau and escalation, are changed to obtain the smallest squared difference. The advantage of using the method with Excel is that a match quality is also obtained during the least-squares analysis. The match quality can be another factor in evaluating the data's match with Equation 1.

Once the stress plateau and escalation parameters are determined, the stress plateau can be compared with the stress load to determine the cause of the plateau. FIG. 3 displays the workflow for evaluating the stress plateau.

If the plateau is naturally occurring, the stress load will have a value that is much smaller than the net pressure at shut-in. On the other hand, when maximum horizontal stress is overcome, and stress escalation is basically cut short, this will cause the stress load to take abnormally high values.

For example, the stress load may not be higher than the net pressure at shut-in. When it happens, this is a clear indication that horizontal stress-anisotropy is responsible for the stress plateau.

Generally, if the stress load is less than half the net-pressure at shut-in, this should give some confidence that fracture reorientation is limited, and that the fracture height calculation may be trusted. However, if the stress load is high, then the ISIP analysis should end because the remaining parameter calculations are questionable.

To reach the evaluation stage of the stress plateau and stress load, type-curves may be used to estimate the interference ratio, total fracture height and stress load. Type-curves may be generated using the analytical formulation for a penny-shaped fracture, or any expression of the stress-correction factor $\Phi$ that may be derived either analytically or obtained through numerical modeling (in geomechanical codes such as ABAQUS, FLAC3D, VISAGE). Such fracture expressions are known in the art and new expressions may be developed.

Simple analytical equations of the decay in stress interference away from a dilated crack exist for two specific fracture geometries (Sneddon 1946, Sneddon et al 1946): 1. Semi-infinite fracture ($L_f >> h_f$) and 2. Penny-shaped fracture ($L_f = h_f$). The increase in stress away from a dilated crack ($\Delta\sigma_{xx}$) can be normalized by the net shut-in pressure inside the fracture ($p_{net}$), and is maximum at the surface of the fracture. Such normalized forms are referred to as the stress-correction factor $\Phi$ (i.e. $\Phi = \Delta\sigma_{xx}/p_{net}$). The stress-correction factor is always between 0 and 1, and represents the decay of stress interference away from a single fracture. The analytical expressions of the stress correction factor on a line perpendicular to a dilated fracture and going through its center are provided in EQU. 2 and EQU. 3, respectively for a semi-infinite and a penny-shaped fracture, and are plotted in FIG. 2.

$$\Phi_{semi-infinite} = 1 - \left(\frac{s_f}{h_f}\right)^3\left[1 + \left(\frac{s_f}{h_f}\right)^2\right]^{-3/2} \quad \text{EQU. 2}$$

$$\Phi_{penny-shaped} = \frac{2}{\pi}\left[\frac{s_f}{h_f}\frac{(s_f^2 - h_f^2)^2}{(s_f^2 + h_f^2)^2} - \tan^{-1}\left(\frac{h_f}{s_f}\right)\right] \quad \text{EQU. 3}$$

The multi-stage analytical model of stress interference is then built by superposing the stress interference for multiple consecutive fractures, based on the proposed recurrence relationship in EQU. 4:

$$\Delta\sigma_{shadow}(n+1) = \Phi[\sigma_{load} + \Delta\sigma_{shadow}(n)] \quad \text{EQU. 4}$$
$$= \Phi\Delta\sigma_{shadow}(n) + \Phi\sigma_{load}$$

Wherein $\Delta\sigma_{shadow}(0) = 0$ and $\Delta\sigma_{shadow}(1) = \Phi\sigma_{load}$. EQU. 4 may also be solved analytically, by elevating the order of the recurrence equation, in order to render it homogeneous. The solution of the recurrence equation is a two-parameter equation and is function of the stress-correction factor $\Phi$ and of the stress load ($\sigma_{load}$) (EQU. 5).

$$\Delta\sigma_{shadow}(n) = \frac{\Phi\sigma_{load}}{1-\Phi}(1-\Phi^{n-1}) \quad \text{EQU. 5}$$

The parameters of the empirical form of the stress-escalation equation (EQU. 1) can be expressed as a function of the parameters of the analytical form of the stress-escalation equation (EQU. 5) as shown in EQU. 6, EQU. 7 and EQU. 8

$$\Delta\sigma_{plateau} = \lim_{n\to\infty}\Delta\sigma_{shadow}(n) = \lim_{n\to\infty}\left(\frac{\Phi\sigma_{load}}{1-\Phi}(1-\Phi^{n-1})\right) = \frac{\Phi\sigma_{load}}{1-\Phi} \quad \text{EQU. 6}$$

$$\text{Interference Ratio} = \quad \text{EQU. 7}$$

$$\frac{d}{dn}\left(\frac{\Delta\sigma_{shadow}(n)}{\sigma_{load}}\right)_{n=1} = -\frac{\Phi}{1-\Phi}\left(\frac{d\Phi^{n-1}}{dn}\right)_{n=1} = \frac{\Phi\ln(\Phi)}{\Phi-1}$$

$$\text{Escalation} = \frac{\Delta\sigma_{plateau}}{\sigma_{load}\times\text{Interference Ratio}} = \frac{-1}{\ln(\Phi)} \quad \text{EQU. 8}$$

Type-curves prepared exclusively for the described methods can be used for the determination of the hydraulic fracture height for a given multi-stage simulation. The type-curves were developed by matching analytical models of multi-stage mechanical stress interference with the stress equation (EQU. 1). However, these type-curves assume a semi-infinite fracture geometry ($L_f \gg h_f$).

The prepared type-curves, shown in FIGS. 4A-E, were created for 1-5 perforation clusters per stage for load-normalized stress plateaus, escalation number, and interference ratio, assuming the hydraulic fractures are semi-infinite ($L_f \gg h_f$). Other sets of type-curves may be developed with different assumptions on the fracture geometry, hence for different expressions of the stress-correction factor $\Phi$. Each plot was also matched with a power-law equation (FIG. 4A-D) or polynomial equations (FIG. 4E).

A user can manually go through each prepared type-curve to determine the stress load or interference ratio. Or, if using a spreadsheet, the power-law equations or polynomial equations can be coded into the spreadsheet and the calculation of the fracture height can be automated.

The outputs of the ISIP model include the horizontal-stress anisotropy ($\sigma_{hmax}$-$\sigma_{hmin}$) which can be used in a geomechanical model (such as ABAQUS, FLAC3D, VISAGE, etc.), and hydraulic fracture height and length (including surface area), which can be used as inputs in reservoir and geomechanical models, and help calibrate fracturing models (like GOHFER, STIMPLAN, MANGROVE, etc.). The methods describe above utilize non-transitory machine-readable storage medium, which when executed by at least one processor of a computer, performs the steps of the method(s) described herein.

Once the ISIP analysis is complete, the fracturing models can be optimized according to the results of the ISIP analysis and can then be implemented in future fracturing stages or at similar wells. Once implemented, hydrocarbon production can commence or continue.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Alternatively, many-cores can be used in the computing. Slower systems could also be used, because the processing is less compute intensive than for example, 3D seismic processing.

Ideally, the inventive methods are performed in the same computers running the modeling programs to ease the transfer of data after the ISIP analysis steps. However, this is not a requirement.

This summary is provided to introduce a selection of concepts that are further described below in the detailed description. This summary is not intended to identify key or essential features of the claimed subject matter, nor is it intended to be used as an aid in limiting the scope of the claimed subject matter. Further, there are many ways to write equations, and/or write similar equations that produce similar results, so all equations discussed herein are intended to include equivalents thereof.

"Fracing" or "Fracking", as used herein, may refer to any process used to manually initiate and propagate a fracture in a rock formation, but excludes natural fracking. Additionally fracking may be used to increase existing fractures in a rock formation. Fracking may include forcing a hydraulic fluid in a fracture of a rock formation to increase the size of the fracture and introducing proppant (e.g., sand) in the newly induced fracture to keep the fracture open. The fracture may be an existing fracture in the formation, or may be initiated using a variety of techniques known in the art. "Hydraulic Fracking" means that pressure was applied via a fluid.

As used herein, "anisotropic stress" means stress values are different in different directions.

"Horizontal stress anisotropy" is the difference between minimum and maximum horizontal stress ($\sigma_{hmax}$-$\sigma_{hmin}$). It impacts how induced fractures interact with planes of weakness naturally present in the formation. Elevated values of the horizontal stress anisotropy can indicate tensile branching of induced fractures along natural fractures being impeded, thus preventing fracture complexity and ultimately decreasing the surface area contacted by the hydraulic stimulation.

"Fracture reorientation" involves inducing a second artificial fracture into a altered-stress zone, with this secondary fracture propagating in a different direction from the original. For reorientation to occur, the far-field stress regime has to have altered in orientation from the time the original fracture was created.

"Shut-in pressure" (SIP) refers to the surface force per unit area exerted at the top of a wellbore when it is closed at either the Christmas tree or the BOP stack. The pressure may be from the formation or an external and intentional source, and combinations thereof. The SIP may be zero, indicating that any open formations are effectively balanced by the hydrostatic column of fluid in the well. If the pressure is zero, the well is considered to be dead, and can normally be opened safely to the atmosphere.

As used herein, "instantaneous shut-in pressure" or "ISIP" is the final injection pressure excluding pressure drop due to friction in the wellbore and perforations or slotted liner. There are numerous ways to estimate ISIP, any of which can be used hereunder, but the preferred method records the pressure value past the early rapid falloff. Water hammer often occurs following shut-in, and common practice is to extrapolate the slope at the end of the water hammer to the shut-in time.

ISIPs escalate from toe to heel in all wells as a result of the mechanical interference induced by hydraulic fractures often referred to as "stress shadowing". However, the ISIP typically reaches a "stress plateau" after the first couple of stages.

"ISIP Analysis" is the evaluation steps of the methods disclosed herein that matches the ISIP escalation during a multi-stage plug-and-perf completion with developed analytical equations and type-curves to obtain fracturing information such as fracture height, length, and area and the horizontal stress anisotropy. The results of the ISIP analysis are utilized by modeling programs for optimizing a reservoir simulation plan, although other uses in the reservoir and geomechanical models are possible.

A "water hammer" is used in accordance with its art accepted meaning of a pressure transient. A pressure transient is generated when a sudden change in injection rate occurs due to a valve closure or injector shutdown. This pressure transient—referred to as a water hammer—travels down the wellbore, is reflected back and induces a series of pressure pulses on the sand face.

As used herein, "escalation number" refers to number of stages after which induced stresses are equal to some pre-determined percentage of the stress plateau. It is independent of the stress load.

By "in-situ closure stress", the in-situ minimum horizontal stress as hydraulic fractures propagate perpendicular to the minimum horizontal stress direction. When the pressure in the fracture is greater than the fracture-closure pressure, the fracture is open.

By "stress load", we refer to the net pressure in the hydraulic fracture(s) of one stage just prior to the start of the subsequent stage, which is the source of induced stress interference. Factors influencing the magnitude of the stress load include:

Volume of the slurry pumped during the stage
Fracture geometry (height, length, number of perforation clusters)
Mechanical properties (Young's modulus, Poisson's ratio)
Resting time between consecutive stages
Leak-off coefficient Residual load exists as the fracture fluids leaks off and the fracture faces close on the proppant, which is a function of the "closure load" (i.e. amount of proppant/stage).

"Stress interference" refers to stresses that interfere in the fracture propagation and result in reorientation. Stress interference phenomena have tremendous diagnostic value as they relate to the: 1) geometry of the induced fractures (height) and 2) in-situ stresses. The stress interference increases which each new fracturing stage.

The "interference ratio" is defined as:

$$\text{Interference Ratio} = \frac{\Delta\sigma_{plateau}}{\sigma_{load} \times \text{Escalation}}$$

and represents the relative magnitude of stress interference between subsequent stages, which is always comprised between 0 and 1. The tighter the stage spacing the larger the induced stress plateau is for a given value of the escalation number.

"Type-curves" as used herein, refer to those graphs built by matching analytical models of multi-stage mechanical stress interference with the stress equation provided by Equation 1. The response of the type-curves has also been captured by correlation equations for ease of calculations. The type-curves, and correlation equations, presented here are for use with the disclosed ISIP analysis. No additional type-curves need to be prepared to use the analysis.

"Match curves" as used herein, refer to the best fit of the stress-escalation equation with collected shut-in pressures obtained by means of a regression method, preferably linear least squares regression. The $\Delta\sigma_{plateau}$ and escalation number are varied until a solution to Equation 1 that minimizes the sum of the squared deviations between the data and the model is found.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| $\Delta\sigma_h$ | Horizontal stress anisotropy ($\sigma_{hmax} - \sigma_{hmin}$) |
| $\Delta\sigma_{shadow(n)}$ | Stress interference at n stage |
| E | Young's modulus |
| Escalation | Escalation number |
| FT | feet |
| $h_f$ | Fracture half-height |
| Interference | Interference Ratio |
| ISIP | Instantaneous shut-in pressure |
| $L_f$ | Fracture half-length |
| $n_{cluster}$ | Number of perforation clusters per stage |
| perf | Perforation |
| $p_f$ | Fracturing pressure at shut-in |
| $p_{net}$ | Net pressure in the hydraulic fractures at shut-in ($=p_f - \sigma_{hmin}$) |
| PSI | Pound per square inch |
| PTA | Pressure Transient Analysis |
| RTA | Rate Transient Analysis |
| $s_{cluster}$ | Spacing between perforation clusters |
| $s_f$ | Spacing between fracturing stages |
| $V_{slurry}$ | Slurry volume per stage |
| $\Delta\sigma_{plateau}$ | Induced stress plateau |
| $\nu$ | Poisson ratio |
| $\sigma_{hmax}$ | Horizontal maximum stress |
| $\sigma_{hmin}$ | Horizontal minimum stress |
| $\sigma_{hmin\_insitu}$ | In-situ closure stress |
| $\sigma_{load}$ | Stress load |
| $\sigma_v$ | Overburden stress |
| $\gamma$ | Stress-correction factor |

DESCRIPTION OF EMBODIMENTS OF THE DISCLOSURE

The invention provides novel analytical methods to calculate hydraulic fracture dimensions and in-situ horizontal stress anisotropy from the escalation of instantaneous shut-in pressures in a multi-stage horizontal completion. The shut-in pressure and a series of type-curves can be used to estimate fracture variables that are typically hard to determine. From there, an operator can determine if there is significant fracture overlap and inefficient recovery. The reservoir simulation plan can then be optimized to overcome any inefficiency.

Figure 4A:
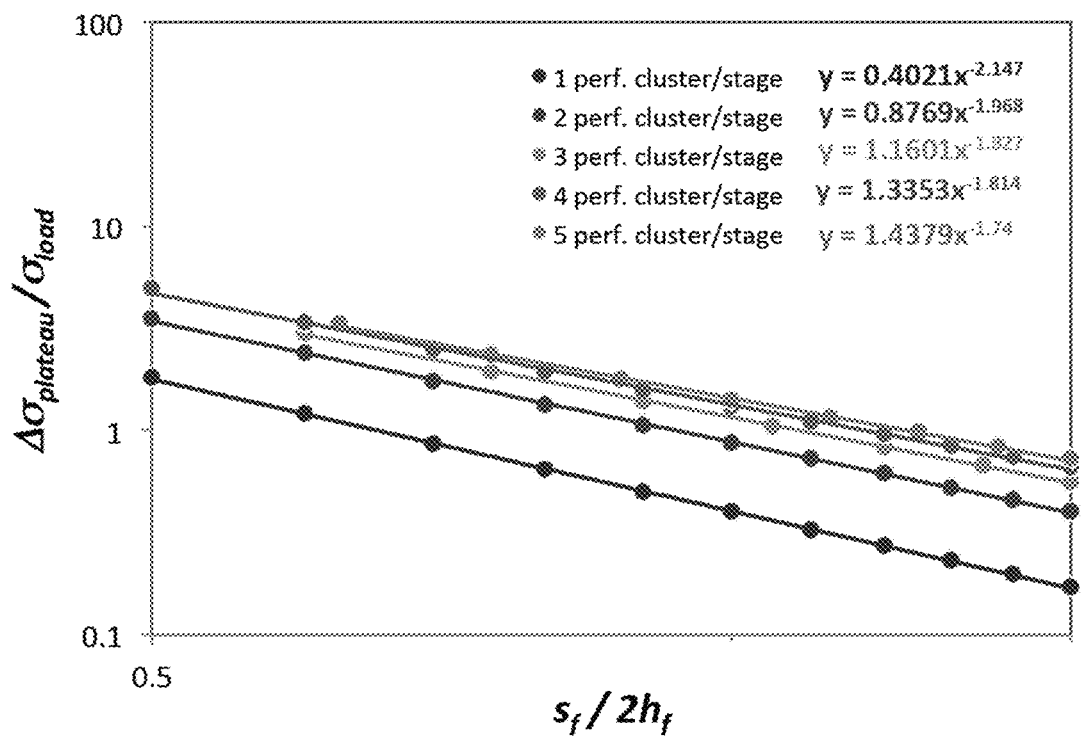
FIG. 4A-E. Type-curves for fracturing procedures having 1-5 perforation clusters per stage.
Figure 4B:
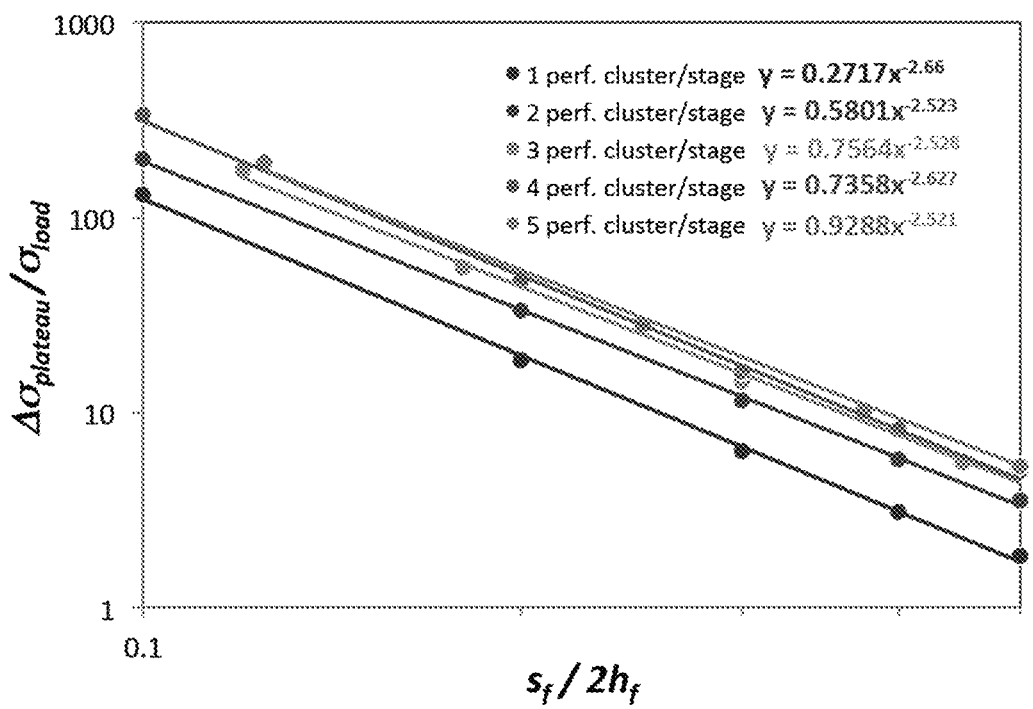
Figure 4C:
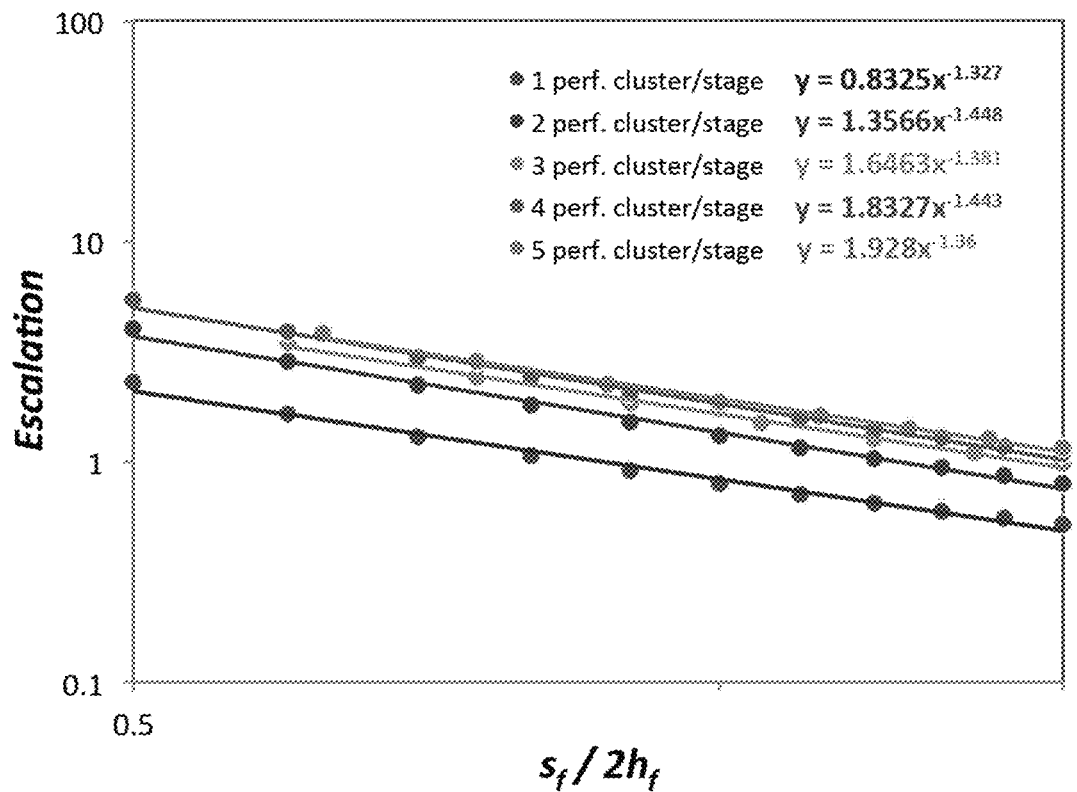
Figure 4D:
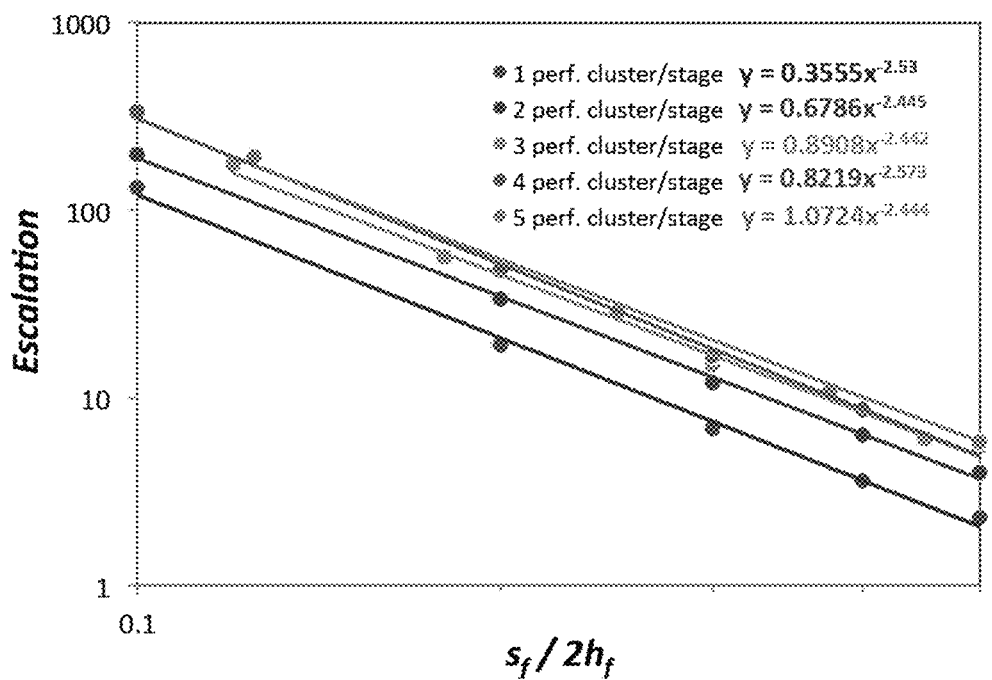
Figure 4E:
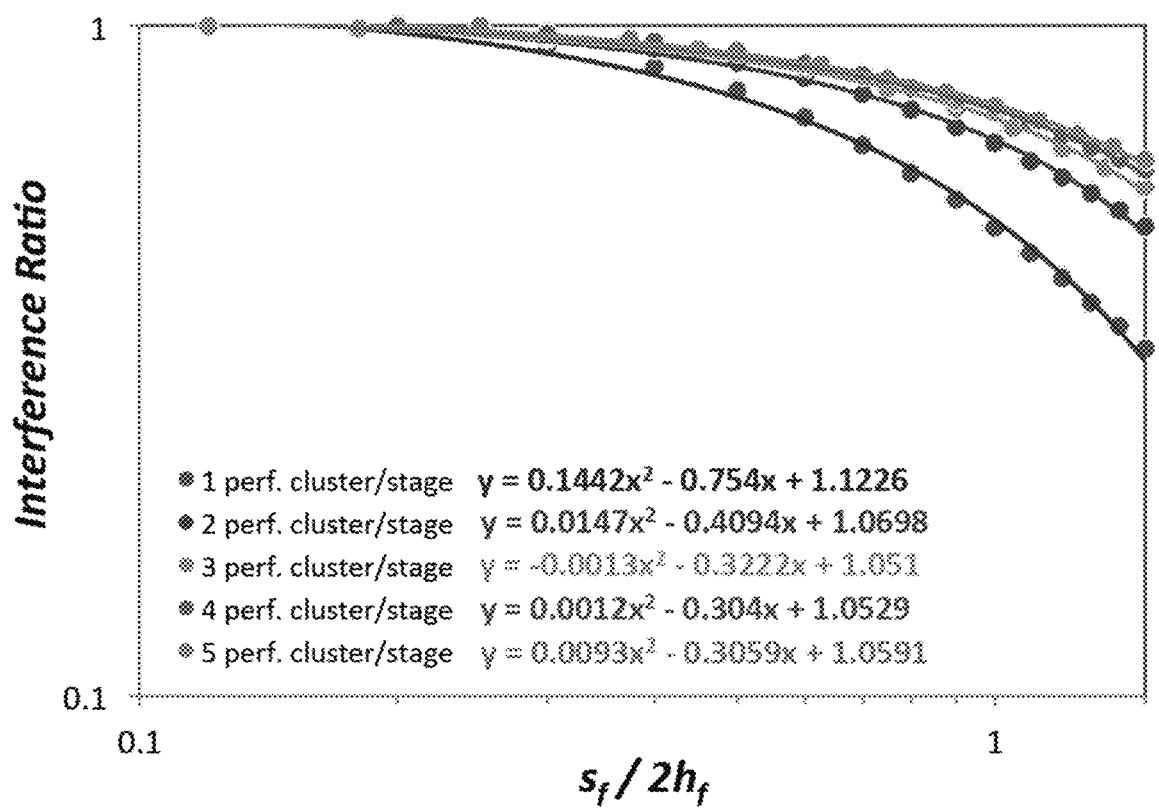

The present methods includes any of the following embodiments in any combination(s) of one or more thereof:

A method for fracturing a reservoir including obtaining shut-in pressure in a reservoir for n stages of a multistage fracturing process having a known cluster number per stage and stage spacing and calculating a net pressure at shut-in; inputting the shut-in pressure data into a spreadsheet software stored in a non-transitory memory of a computer and matching the shut-in pressure with Equation 1 or its equivalent by varying an estimated stress plateau parameter and an estimated escalation number using a regression method in the spreadsheet software; extrapolating the stress interference (I) using the type-curves in FIG. 4C-E (or their equivalent) for the cluster number per stage, the estimated escalation number, and the estimated stress plateau parameter, calculating the stress load using Equation 9 or its equivalent; determining if stress plateau is caused by overcoming the in-situ horizontal stress anisotropy by comparing the calculated stress load with the net pressure at shut-in, wherein the stress plateau is considered to be naturally occurring if the stress plateau is less than or equal to half of the net pressure at shut-in, wherein the stress plateau is considered to be caused by overcoming horizontal stress anisotropy if the stress plateau is more than net pressure at shut-in, and wherein if the stress plateau is naturally occurring, the fracture height is calculating using Equation 10 or its equivalent; inputting said horizontal-stress anisotropy and the fracture height into a reservoir model software; optimizing a reservoir fracturing plan using the reservoir model software; and, implementing the optimized reservoir fracturing plan to fracture the reservoir.

A method for fracturing a reservoir including obtaining shut-in pressure in a reservoir for n stages of a multistage fracturing process having a known cluster number per stage and stage spacing and calculating a net pressure at shut-in; inputting the shut-in pressure data into a spreadsheet software stored in a non-transitory memory of a computer and matching the shut-in pressure with $$\Delta \sigma_{shadow}(n) = \Delta \sigma_{plateau}\left(1 - e^{\frac{1-n}{Escalation}}\right)$$

or its equivalent by varying an estimated stress plateau parameter and an estimated escalation number using a regression method in the spreadsheet software; extrapolating the stress interference (I) using the type-curves in FIG. 4C-E (or their equivalent) for the cluster number per stage, the estimated escalation number, and the estimated stress plateau parameter, calculating the stress load using:

$$\sigma_{load} = \frac{\Delta \sigma_{plateau}}{\text{Interference Ratio} \times \text{Escalation}}$$

or its equivalent; determining if stress plateau is caused by overcoming the in-situ horizontal stress anisotropy by comparing the calculated stress load with the net pressure at shut-in, wherein the stress plateau is considered to be naturally occurring if the stress plateau is less than or equal to half of the net pressure at shut-in, wherein the stress plateau is considered to be caused by overcoming horizontal stress anisotropy if the stress plateau is more than net pressure at shut-in, and wherein if the stress plateau is naturally occurring, the fracture height is calculating using $$L_f = \frac{3V_{slurry}E}{8\pi(1-v^2)h_f^2(ISIP(1)-\sigma_{hmin})} \left\{1 + (n_{cluster}-1)\left[1+\left(\frac{h_f}{2s_{cluster}}\right)^2\right]^{-3/2}\right\}$$

or its equivalent; inputting said horizontal-stress anisotropy and the fracture height into a reservoir model software; optimizing a reservoir fracturing plan using the reservoir model software; and, implementing the optimized reservoir fracturing plan to fracture the reservoir.

The above method, wherein the regression method is least squares regression analysis and the matched equation has the smallest squared differences.

Any of the above methods, wherein the implementing step occurs between any two sequential stages in said multistage fracturing process.

Any of the above methods, wherein the shut-in pressure is collected while implementing an initial reservoir model. The shut-in pressure can be measured at the surface, downhole, or both.

Any of the above methods can include the optional step of fracturing a next stage of the reservoir or another well in the reservoir using the calculated stress load, horizontal-stress anisotropy and fracture height. One or more of the following modified parameter(s) of the fracturing process can be selected and modified during the next stage: cluster number per stage, cluster spacing, stage spacing, fracturing pressure, fracturing fluid type, fracturing fluid volume, fracturing fluid viscosity, proppant type, proppant mass, proppant concentration, pumping rate, pumping schedule or combinations thereof Any of the above methods can include a step for estimating the hydraulic fracture length and the induced fracture area using Equation 11 or its equivalent.

Any of the above methods can include the additional step of recovering hydrocarbons.

Any of the above methods, type-curves can be developed using any combination of Equations 1-8 or their equivalent and used in place of the type curves in FIG. 4C-E.

A hydraulic fracture is a pressure-induced fracture caused by injecting fluid into a target rock formation. 'Fracking fluid' is pumped into the formation at pressures that exceed the fracture pressure—the pressure at which rocks break. When fractures are created in a deep-rock formation, natural gas, petroleum, and brine will flow more freely leading to improved hydrocarbon recovery.

At the surface, a sudden drop in pressure indicates fracture initiation, as the fracking fluid flows into the fractured formation. To break the rock in the target interval, the fracture initiation pressure must exceed the sum of the minimum principal stress plus the tensile strength of the rock.

The fracking fluid is mainly water with some additives such as sand or other proppants suspended with the aid of thickening agents (i.e. gels). The volume of fracking fluid injected includes the additional volume created during fracturing and the fluid loss to the formation from leakoff through the permeable wall of the fracture. However, the rate of fluid loss at the growing fracture tip is extremely high. Therefore, it is not possible to initiate a fracture with proppant in the fracturing fluid because the high fluid loss would cause the proppant at the fracture tip to reach the consistency of a dry solid, causing bridging and screenout conditions. Consequently, some volume of clean fluid—a pad—must be pumped before any proppant is pumped.

Proppant is then pumped in following the pad. When the hydraulic pressure is removed from the well, small grains of hydraulic fracturing proppants (either sand or aluminum oxide) hold the fractures open.

To reduce the number of wells that have to be drilled while increasing hydrocarbon recovery, horizontal wells are fractured in stages. A "frack stage" is simply a portion of the usually horizontal section of the well that is being fracked. Horizontal wells commonly have 30-40 frack stages, and the average number of stages per horizontal well in the US is around 16 today.

The horizontal stress anisotropy is the difference between maximum and minimum horizontal stress. While it is generally unknown as a result of a lack of available methods, it plays a key role in the ability to stimulate natural fractures and generate complexity. Operationally, it may impact the spacing of perforations clusters, the sequencing of multi-well fracturing operations, as well as the timing and design of infill and refracturing operations. Fracture reorientation tendencies and deviation from the transverse fracture direction, will increase as the stage spacing or the horizontal stress anisotropy decreases. As every frack stage will contribute to reduce the formation's horizontal stress anisotropy, there is a need to also monitor the design of perforation cluster to optimizing well spacing and stacking in unconventional plays.

The ISIP analysis in the presently disclosed methods calculates the hydraulic length of induced fractures, as well as the hydraulic area stimulated by each frack stage, using only data that is systematically reported after every plug and perforation multi-stage completion. Thus, there is no need to use additional hardware, measurement time or any modification to the well and completion design. Further, the ISIP analysis can also provide estimates of the horizontal stress anisotropy for use in optimization.

The ISIP analysis consists of four basic steps:
1. Collect shut-in pressure data
2. Match shut-in pressure data with a modified linear time invariant system equation;
3. Determine causes of stress plateaus
4. Calculate fracture height, horizontal-stress anisotropy, and other variables using type-curves.

The ISIP analysis will be described in detail below and will reference exemplary results and figures created with data obtained from the well 6H in the Shale I formation for exemplification purposes.

First, the ISIP analysis assumes uniform stage spacing, perforation cluster spacing, number of perforation clusters per stage, stimulation design (especially volume of fluid pumped per stage), lag time between successive stages, hydraulic height, and mechanical properties. As frack fluid leak-off is highly stress-dependent, the stress load in the latter stages of a perforation plan will be less than the stage load at earlier stages when using non-instantaneous shut-in pressures. Thus, analyses of non-instantaneous shut-in pressure data (i.e. 3-min, 5-min shut-in pressures) will result in erroneous evaluations of the total stress induced by the completion and the hydraulic fracture height. For these reasons, the ISIP analysis requires the instantaneous shut-in pressure for a well.

The collected ISIP data is then "matched" with data generated by EQU. 1. The most straightforward solution consists in minimizing the squared differences between the data and 'match' data generated by EQU. 1 (least-squares linear regression). This is achieved by multiple iterations by the optimization method changing the value of the two matching parameters: the stress plateau and escalation. As the current method programmed into an Excel spreadsheet, a solver add-in was used to calculate the iterations. Three optimization solvers are available through Excel. However, GRG Nonlinear is fastest, and does not require bounds to be defined for the matching parameters. Based on repeated use, it generally converges to a unique solution, hence would be a recommended method.

However, other solver add-ins for other spreadsheet software will also work in the invention.

Figure 5A:
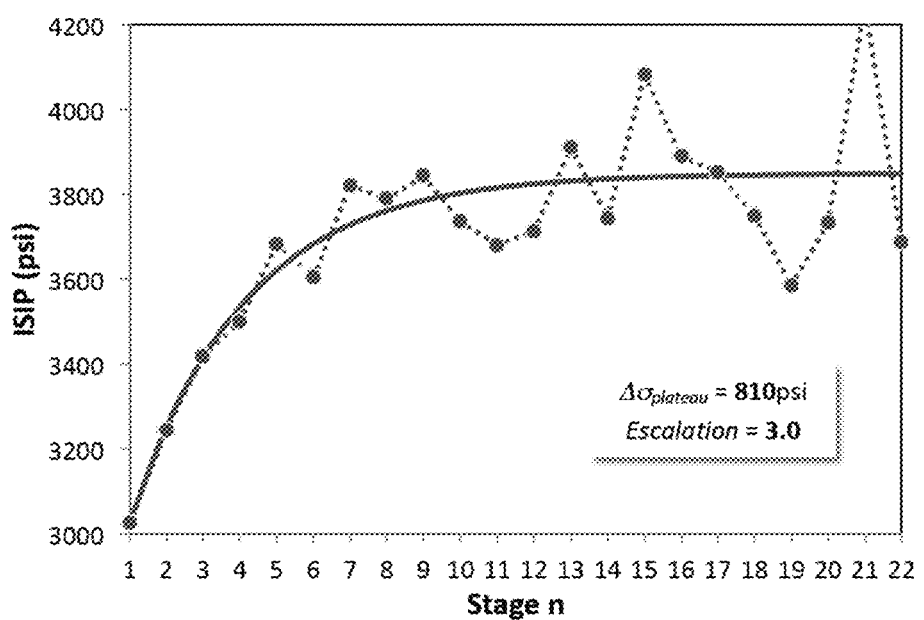
FIG. 5A displays an exemplary plot of ISIP data collected from the 6H well in the Shale I formation along with the type-curve for the matched data and the optimized stress plateau and escalation.

At the end of the matching, a value of the stress plateau and an escalation representative of the field data are produced. FIG. 5A displays an exemplary plot of ISIP data collected from the 6H well in the Shale I formation along with the curve for the matched data and the optimized stress plateau and escalation.

Figure 5B:
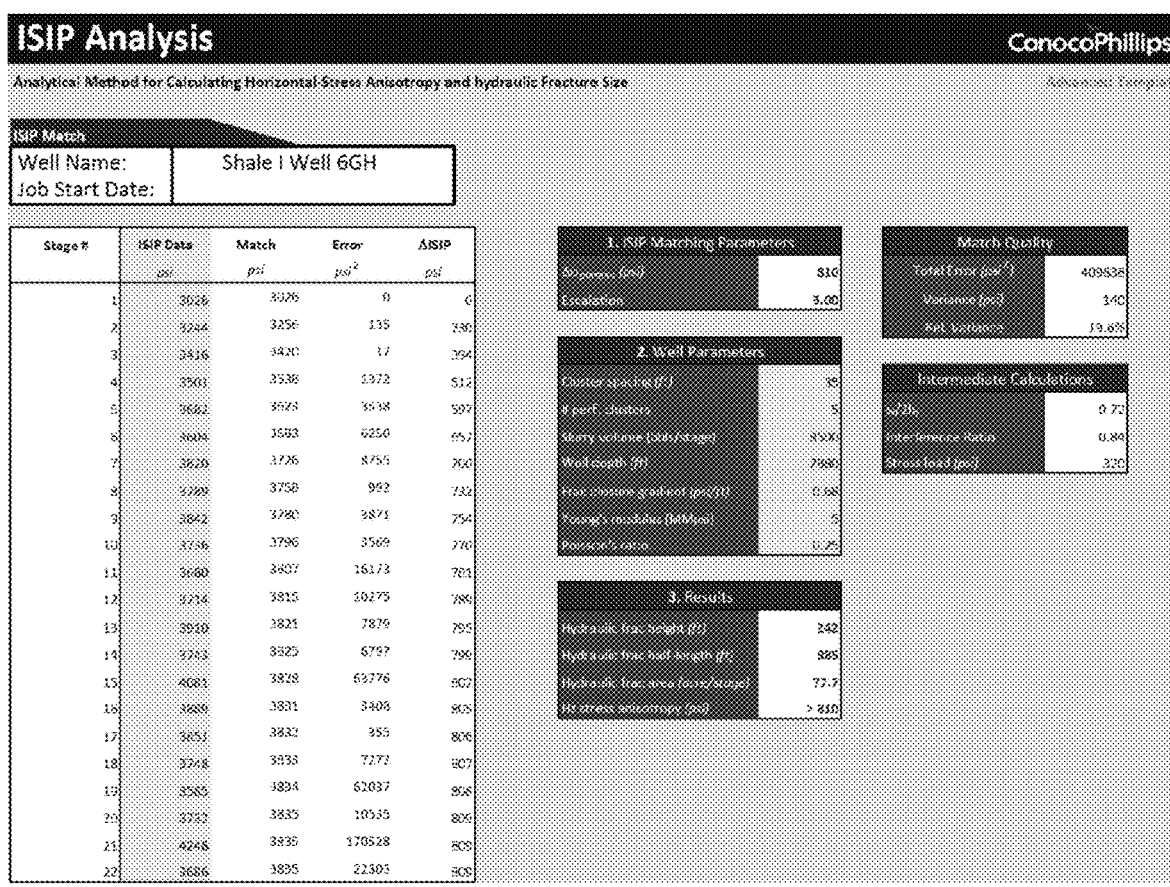
FIG. 5B displays a screenshot of the spreadsheet template for the 6H well.

The benefit of using a spreadsheet with a least-squares based solver is the ability to automatically calculate the quality of the match. FIG. 5B displays a screenshot of the spreadsheet template for 6H. On the right side of the screen, a Match Quality box displays the total error, variance, and relative variance for the least-squares optimization. These indicators indicate how much the matched data deviates from the obtained ISIP data in average for each stage, respectively in absolute psis, or relative to the amount of stress escalation and are used to quantify the quality of the match. The user can set the acceptable amount of relative variance. However, a relative variance of 20% or less is typically a good sign that the results of the analysis may be trusted. On the other hand, results should be ignored if the relative variance exceeds 40-50%.

Figure 1:
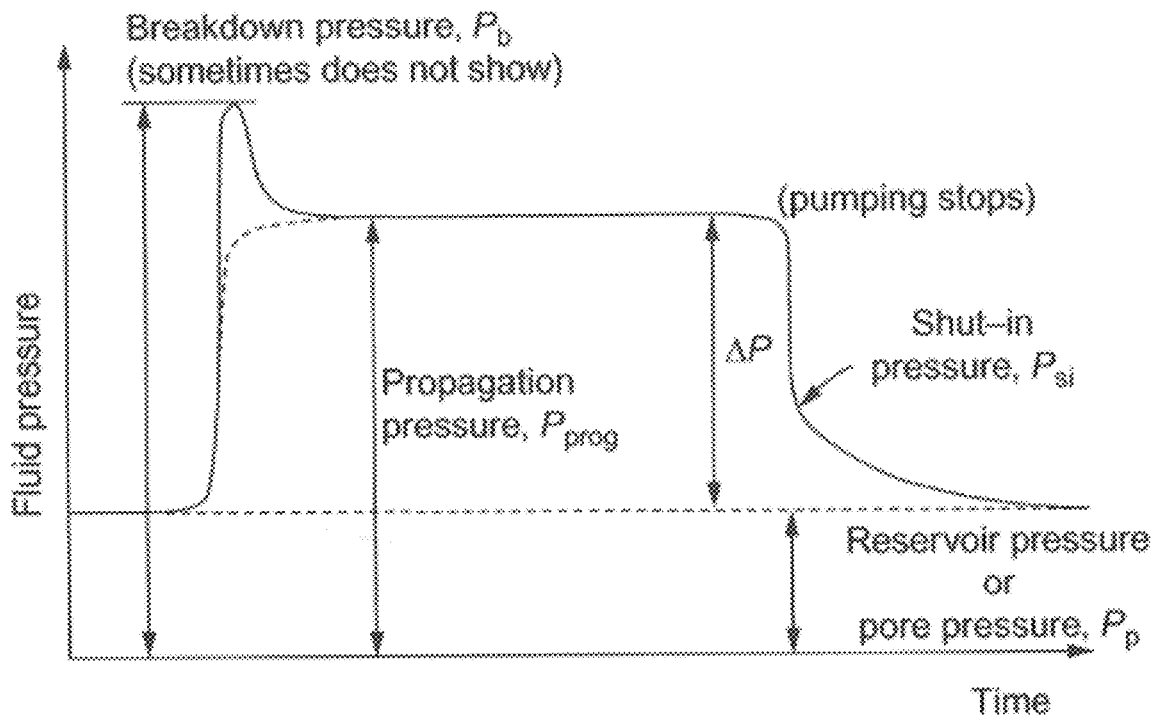
FIG. 1. Typical downhole pressure record during a fracturing stage (Yew and Weng 2015).
Figure 2:
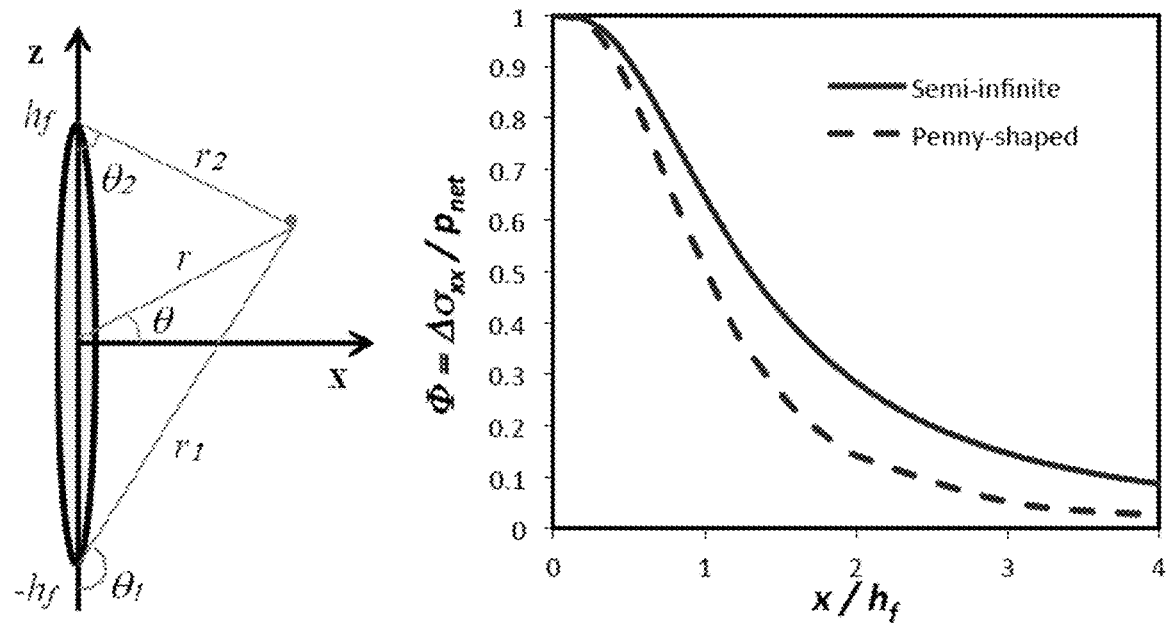
FIG. 2. Analytical expressions of the stress correction factor on a line perpendicular to a dilated fracture and going through its center.
Figure 3:
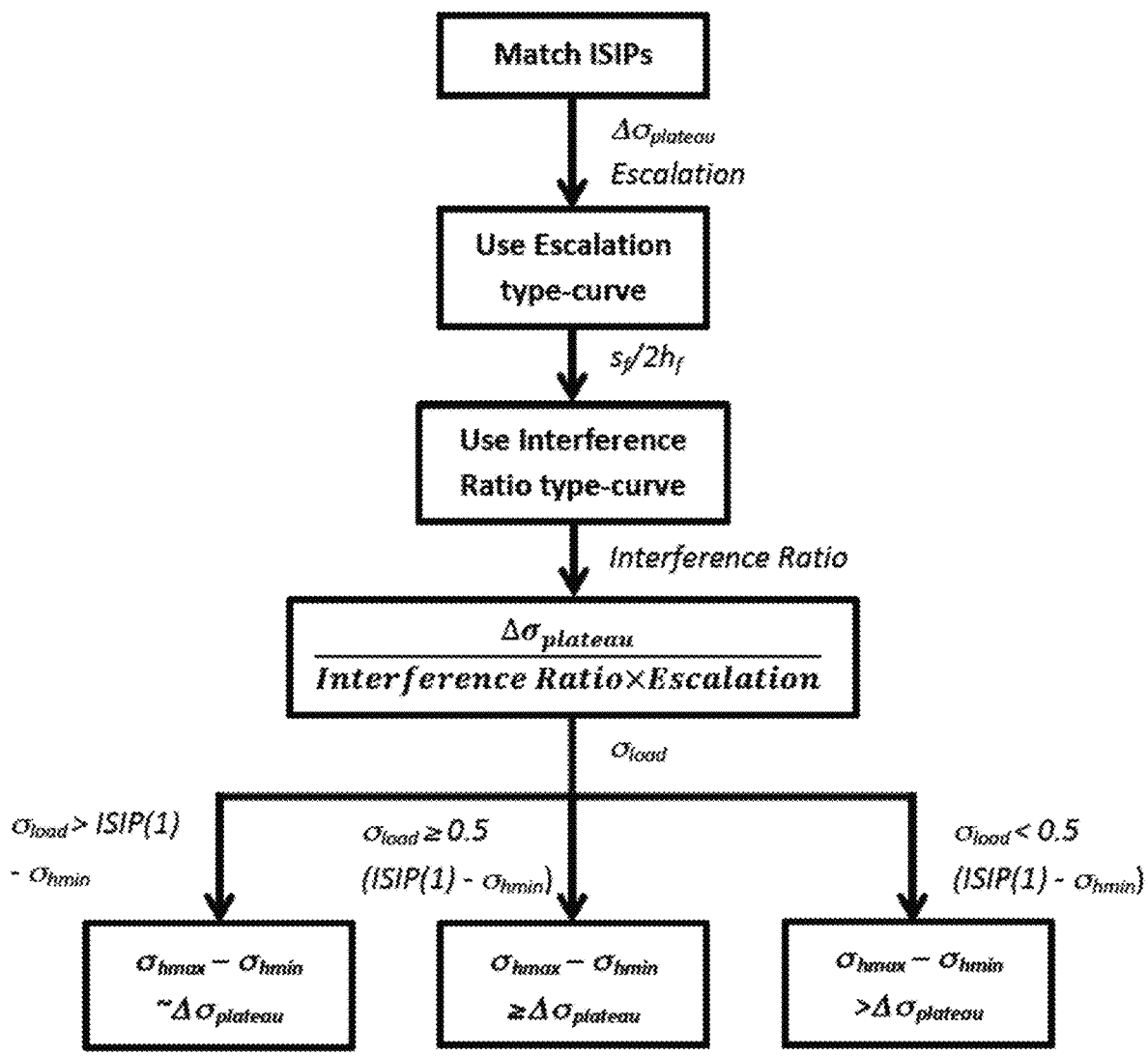
FIG. 3 Workflow to determine cause of stress plateau.

Once a match of the data is determined and has an acceptable relative variance, the causes of the stress plateau are reviewed to ensure that the plateau is naturally occurring. FIG. 3 displays the workflow for this section of the ISIP analysis. The workflow requires the calculation of the stress load ($\sigma_{load}$) through the use of type-curves. The type-curves were built by matching the analytical model of a multi-stage mechanical stress interference with the stress-escalation EQU. 1.

Type-curves were built for the load-normalized stress plateau $\Delta\sigma_{plateau}/\sigma_{load}$), escalation number and interference ratio as a function of height, spacing and number of perf clusters. These type-curves are shown in FIG. 4A-E.

Using the calculated stress plateau and escalation number during the matching step, a user can then extrapolate the stage spacing distance over the total fracture height ($s_f/2h_f$ ratio). This $s_f/2h_f$ ratio can then be used to extrapolate the interference ratio.

Each extrapolation can theoretically be performed manually; however, this is fairly time-consuming. As such, each individual curve in FIG. 4A-D was matched with a power-law correlation and each curve in FIG. 4E was matched with a polynomial correlation. These resulting equations can be programmed into an Excel spreadsheet for quick calculations. For the load-normalized stress plateau, and escalation number, no single correlation matched the type-curves over the entire sf/2hf interval. Thus, they were split into two correlations for sf/2hf<0.5 and >0.5. For the interference ratio, only one quadratic equation is sufficient to match the type-curves over the entire sf/2hf interval. Tables 1-3 provides a listing of each type-curve equation for type curves built under the assumption that the hydraulic fractures are semi-infinite.

TABLE 1

Correlation Equations for $\Delta\sigma_{plateau}/\sigma_{load}$ type-curves

| Perforation cluster/Stage | Correlation Equation (0.1 < $s_f/2h_f$ < 0.5) | Correlation Equation (0.5 < $s_f/2h_f$ < 1.5) |
| --- | --- | --- |
| 1 | y = 0.4021x$^{-2.147}$ | y = 0.2717x$^{-2.66}$ |
| 2 | y = 0.8769x$^{-1.968}$ | y = 0.5801x$^{-2.523}$ |
| 3 | y = 1.1601x$^{-1.827}$ | y = 0.7564x$^{-2.528}$ |
| 4 | y = 1.3353x$^{-1.814}$ | y = 0.7358x$^{-2.627}$ |
| 5 | y = 1.4379x$^{-1.74}$ | y = 0.9288x$^{-2.521}$ |

TABLE 2

Correlation Equations for Escalation type-curves

| Perforation cluster/Stage | Correlation Equation (0.1 < $s_f/2h_f$ < 0.5) | Correlation Equation (0.5 < $s_f/2h_f$ < 1.5) |
| --- | --- | --- |
| 1 | y = 0.3555x$^{-2.53}$ | y = 0.8325x$^{-1.327}$ |
| 2 | y = 0.6786x$^{-2.445}$ | y = 1.3566x$^{-1.448}$ |
| 3 | y = 0.8908x$^{-2.442}$ | y = 1.6463x$^{-1.381}$ |
| 4 | y = 0.8219x$^{-2.573}$ | y = 1.8327x$^{-1.443}$ |
| 5 | y = 1.0724x$^{-2.444}$ | y = 1.928x$^{-1.36}$ |

TABLE 3

Correlation Equations for Interference Ratio type-curves

| Perforation cluster/Stage | Correlation Equation (0.1 < $s_f/2h_f$ < 1.5) |
| --- | --- |
| 1 | y = 0.1442x$^2$ − 0.754x + 1.226 |
| 2 | y = 0.0147x$^2$ − 0.4094x + 1.0698 |
| 3 | y = −0.0013x$^2$ − 0.3222x + 1.051 |
| 4 | y = 0.0012x$^2$ − 0.304x + 1.0529 |
| 5 | y = 0.0093x$^2$ − 0.3059x + 1.0591 |

Through the use of the type-curves and/or their correlation equations, the user will be able to calculate the interference ratio. The interference ratio is relative magnitude of stress interference between subsequent stages, which is always between 0 and 1. The tighter the stage spacing, the larger the induced stress plateau is for a given value of the escalation number. The interference ratio can then be used to calculate the stress load ($\sigma_{load}$) using Equation 9.

$$\sigma_{load} = \frac{\Delta\sigma_{plateau}}{\text{Interference Ratio} \times \text{Escalation}} \quad \text{Eq. 9}$$

If the stress plateau is naturally occurring, the stress load will have a value that is much smaller than the net pressure at shut-in ($p_{net}$=ISIP1−$\sigma_{hmin}$). On the other hand, when maximum horizontal stress is overcome, and stress escalation is basically cut short, this will cause the stress load to take abnormally high values. This means that the calculated fracture height is unlikely to be accurate. However, if the stress load is less than half the net pressure at shut-in, fracture reorientation is limited and the height calculation can be trusted.

Using type-curves, such as those in FIG. 4A-E or their equivalent correlation equations, the number of perforation clusters/stage, and stage spacing, the fracture height can be calculated. Calculating hydraulic fracture height is fairly trivial in the cases where the stress plateau is naturally occurring, but becomes trickier if horizontal-stress anisotropy is overcome during fracturing. In that case, the escalation of stresses is being halted, causing the escalation number to decrease substantially. This in turn will result in a widely underestimated value of the hydraulic fracture height.

There are two strategies for situations where fracture reorientation takes place. In the first strategy, the first couple of data points before the ISIP falls off are matched during step 2. In most cases though, this strategy may not yield a favorable match when using field data, as the noise creates non-uniqueness when matching only a couple points.

The second strategy consists of assuming a value for the stress load and matching the early escalation behavior with EQU. 1, for a fixed value of the stress load.

For most applications, ISIP analysis may be limited to calculating in-situ horizontal stress anisotropy and hydraulic fracture height, as these parameters are most needed for modeling. An advanced method of the ISIP analysis was also constructed to be able to evaluate the hydraulic fracture length and induced fracture area. For this version, the number of input parameters needed is increased. In addition to cluster spacing, number of perforation clusters/stage, well depth and frack closure gradient, you will also be required to provide an estimate for the Young's modulus and Poisson's ratio, as well as the slurry volume pumped for each stage.

Equ. 10 is used to calculate hydraulic fracture length, and Equ. 11 is needed for induced fracture area.

$$L_f = \frac{3V_{slurry}E}{8\pi(1-v^2)h_f^2(ISIP(1)-\sigma_{hmin})} \quad \text{EQU. 10}$$

$$\left\{1 + (n_{cluster}-1)\left[1 + \left(\frac{h_f}{2s_{cluster}}\right)^2\right]^{-3/2}\right\}$$

$$A_f \approx \frac{3^{0.375} V_{slurry} n_{cluster} E}{2(1-v^2)h_f(ISIP(1)-\sigma_{hmin})} \quad \text{EQU. 11}$$

$$\left\{1+(n_{cluster}-1)\left[1+\left(\frac{h_f}{2s_{cluster}}\right)^2\right]^{-3/2}\right\}$$

Once the hydraulic fracture height and horizontal stress anisotropy are calculated, the values can be used to optimize fracturing models and operations. The results from the ISIP analysis can be inputted into any known reservoir simulation software that is commercially available or developed in-house.

In some embodiments, the results are used in a reservoir simulation program to predict reservoir performance characteristics, such as fracturing, production rates, total production levels, rock failures, faults, wellbore failure, optimal stage and perforation cluster spacing, and the like. Or, the results are used to optimize and implement a hydraulic fracturing program or modify a hydraulic fracturing program or pattern for subsequent steps in a given well or wellpad. The ultimate goal is to use the results for executing a fracking program for subsequent production of hydrocarbons via the now optimally fracked well.

The present methods are exemplified with respect to the examples below. However, this is exemplary only, and the methods can be broadly applied to any well undergoing fracturing or analytical models of intended multi-stage fracturing plans. The following examples are intended to be illustrative only, and not unduly limit the scope of the appended claims.

Test 1: Shale I Formation

Instantaneous shut-in pressure was collected for three wells in the Shale I formation for analysis by the described methods. Two of the wells, 8H and 9H, have closely spaced perforation clusters of 17 feet, which is expected to induce a higher stress interference. The third well, 1H, has a larger spacing of perforation clusters (35 feet).

Figure 6:
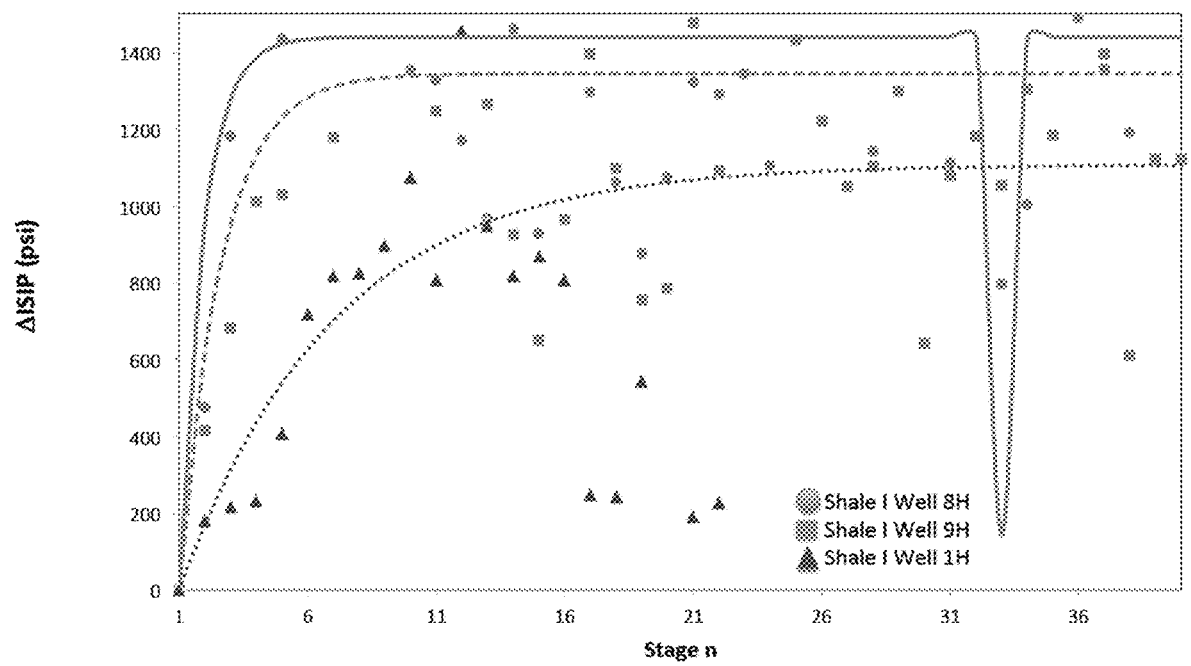
FIG. 6 shows the ISIP evolution and match for the 8H (circle markers and solid line), 9H (square markers and dashed line), and 1H (triangular markers and dotted line) wells in the Shale I formation.

The ISIP data was matched with EQU. 1 and the analysis followed the workflow shown in FIG. 3. The ISIP evolution and match for all three wells is shown in FIG. 6 and the results for the analysis is shown below in Table 4:

TABLE 4

ISIP analysis results from Shale I formation wells

| Well | $s_f$ (ft) | $\Delta\sigma_{plateau}$ (psi) | Escalation | $s_f/2h_f$ | Interference Ratio | $\sigma_{load}$ (psi) | Calculated hydraulic height (ft) | Calculated stress anisotropy (psi) |
|---|---|---|---|---|---|---|---|---|
| Shale I Well 8H | 85 | 1440 | 0.92 | 1.72 | 0.56 | 2795 | >49 | ~1440 |
| Shale I Well 9H | 85 | 1344 | 1.63 | 1.13 | 0.72 | 1227 | >102 | ~1344 |
| Shale I Well 1H | 140 | 1108 | 6.0 | 0.49 | 0.91 | 264 | 292 | >1108 |

The stress anisotropy has been overcome for 8H and 9H, as the calculated stress load is higher than the net pressure at shut-in ($p_{net}$=1080 psi). The lower values of Interference Ratio compared to 1H, even though stage spacing has been reduced by 50%, are another indication. The calculated hydraulic heights for 8H and 9H will be meaningless because the stress load is higher than the net pressure at shut-in. However, the in-situ horizontal-stress anisotropy may be extracted from this data and used to optimize the fracturing design.

The third well, 1H, does not overcome horizontal stress anisotropy as evidenced by the calculated stress load being well below the net pressure at shut-in. This is a strong indication that horizontal-stress anisotropy is higher than 1108 psi. As such, the fracture was able to close during the time separating the subsequent fracture stages. Thus, the height estimated by the ISIP analysis will correspond to the propped height of the fracture.

This study demonstrates that analyzing ISIPs for multiple wells in a similar area can narrow down tremendously the range of horizontal-stress anisotropy. The analysis of ISIPs may shed light on the amount of stress needed to overcome the in-situ stress anisotropy and thus favor the propagation of complex fracture networks, especially in very low permeability matrix rocks.

For the Shale I formation, the hydraulic fracture height was calculated for a multiplicity of completion designs, and a total of 7 wells. The results are shown in Table 5.

TABLE 5

Calculated values of hydraulic height for 7 Shale I formation wells

| Well | $S_{cluster}$ (ft) | #clusters | Fluid type | Calculated hydraulic height (ft) |
|---|---|---|---|---|
| Shale I, Well 1H | 35 | 4 | X-linked gel | 292 |
| Shale I, Well 2H | 35 | 5 | Slickwater | 242 |
| Shale I, Well 3H | 35 | 5 | Slickwater | 235 |
| Shale I, Well 4H | 35 | 4 | X-linked gel | 192 |
| Shale I, Well 5H | 35 | 4 | Slickwater | 231 |
| Shale I, Well 6H | 35 | 5 | Slickwater | 242 |
| Shale I, Well 7H | 35 | 5 | Slickwater | 298 |

The average value of the calculated hydraulic height for the 7 wells analyzed above is 248 feet, with a standard deviation of 33 feet. Applying ISIP analysis on a just few wells has provided confidence that hydraulic fractures propagate vertically most likely between 215 feet and 281 feet for all of these wells.

The estimates of the vertical propagation of the hydraulic fractures can then be used in reservoir simulators for production forecasting and reservoir evaluation. Further, additional changes to the fracturing fluid and/or cluster number/spacing can be made to improve the design and implementation of the recovery plans, resulting in improved recoveries as compared with existing methods.

Test 2: Shale II Formation

Values of pressures taken up to 10 minutes after shut-in were analyzed using the disclosed method to determine if they were suitable for evaluation by the ISIP analysis.

Pressure data was obtained from the well 1H in the Shale II formation, with large potential reserves. Thus, improved fracturing monitoring would increase the recovery of the shale oil and be of great benefit. Shale II, well 1H has a perforation cluster spacing of 48 feet, a stage spacing was 192 feet and the perforation clusters/stage is 4.

Figure 7:
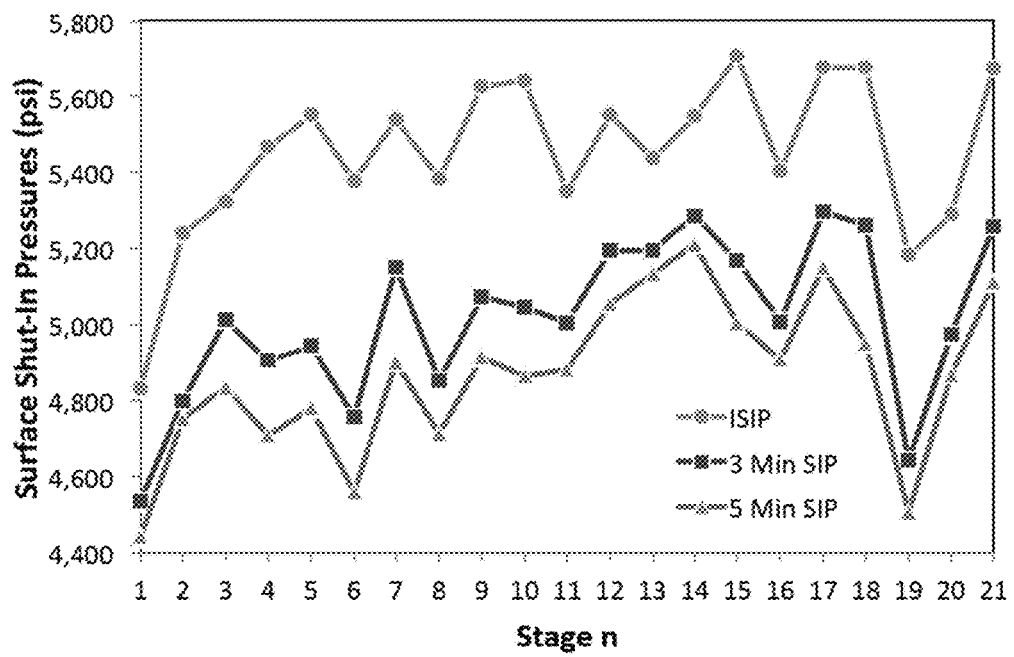
FIG. 7 displays the instantaneous, 3-min, and 5-min shut-in pressures for the Shale II well 1H.

FIG. 7 displays the pressure curves for the instantaneous, 3-min, and 5-min shut-in pressure. As expected the pressure in the induced-fracture system drops quite rapidly in the first few minutes following shut-in, as the fluid in the fractures slowly leaks off in the formation and the fractures gradually close. The shut-in pressure curves thus shift down as more time elapses between shut-in and when the pressure is being recorded.

Figure 8:
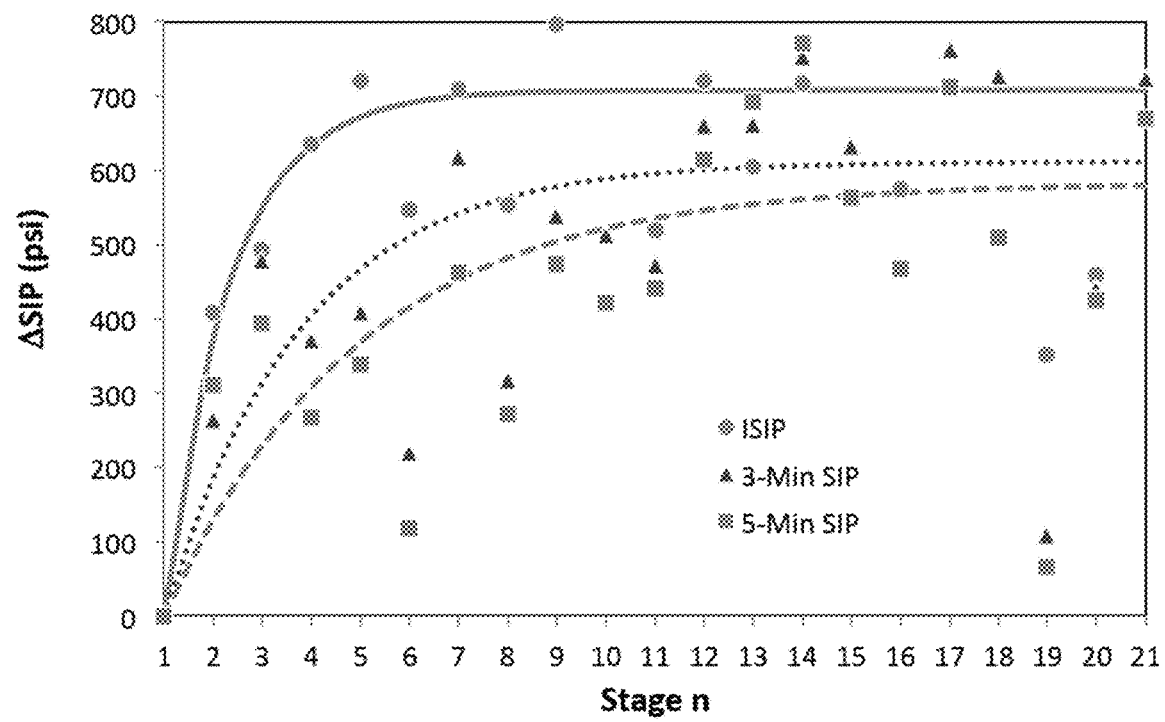
FIG. 8 shows the ISIP evolution and match for the instantaneous (circle markers and solid line), 3-min (triangular markers and dotted line), and 5-min (square markers and dashed line) shut-in pressures for well 1H.

Each pressure curve was analyzed using the current methods. FIG. 8 displays the 'match' curve using EQU. 1 and Table 6 display the calculated parameters.

TABLE 6

Calculated hydraulic heights for instantaneous, 3-min, and 5-min shut-in pressures for Shale II, Well 1H

| Time after shut-in | $\Delta\sigma_{plateau}$ (psi) | Escalation | Calculated hydraulic height (ft) |
|---|---|---|---|
| 0 | 701 | 1.38 | 154 |
| 3 min | 612 | 2.78 | 263 |
| 5 min | 583 | 4.0 | 325 |

What is demonstrated clearly from this exercise is that fracking fluid leak-off is highly stress-dependent. Leak-off accelerates with each new frack stage as stress interference builds up and the normal stress exerted on the fractures increases. As a result, the stress load in the latter stages will be less than the stage load at earlier stages, when looking at non-instantaneous shut-in pressures, which violates a fundamental assumption of the ISIP analytical model. For this reason, analyses of non-instantaneous shut-in pressure data will result in erroneous evaluations of the total stress induced by the completion and the hydraulic fracture height.

Test 3: Outliers

There are many reasons why collected ISIPs may deviate from the trend characteristic of the stress-escalation equation. Some of the factors may be operational in nature; others may be related to the geology:
Stage screen-outs
Inconsistent slurry volumes or fluid type
Inconsistent lag time between stages
Well trajectory
Vertical/lateral heterogeneity in mechanical properties
Fault In the event of a screen-out or equipment failure during a frack stage, it should be fairly straightforward to identify the ISIP datapoint and exclude it from the match. Because outlier ISIP values may impact the quality of the match, it is better to take them out of the analysis where possible. Typically, the completion engineer is most knowledgeable about operational factors and may be able to identify the ISIP outliers much easier than others. Therefore, they are likely the best user to be running the ISIP analysis portion of the method.

Figure 9:
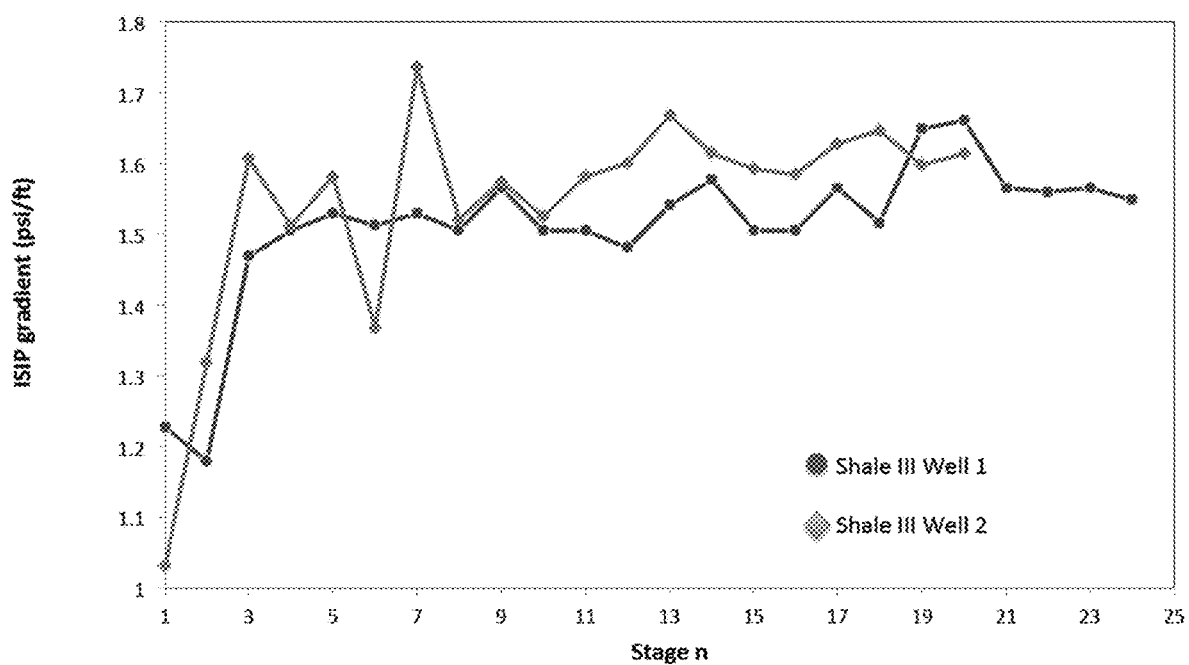
FIG. 9 provides an ISIP gradient for two Shale III formation wells.

FIG. 9 shows an example of removing an outlier in the Shale III formation. The evolution of ISIP in the first two stages of Shale III, well 1 is clearly inconsistent with a typical stress-escalation behavior. Now the difficulty is to determine which point(s) may be problematic. This was achieved by comparing to another well in a similar formation and location (Shale III, well 2).

Comparing the two wells, it becomes clear the ISIP of stage 1 for Shale III, well 1 is too high, and the stage 2 ISIP may also be a bit low. Looking into the completion operations into more detail, it was found that just a couple hours prior to the first stage, a toe DFIT was conducted on the same well. This explains the abnormally high value of ISIP for the first stage, as extra pressure and stress was present in the near-wellbore region following the DFIT. As a result, to complete the analysis of Shale III, well 1, stage 1 ISIP was decreased to the same gradient value as Shale III, well 2.

Variations due to heel/toe discrepancies can also present as outliers. ISIP variations occurring in the heel stages may generally be excluded from the analysis as they can only be explained by geological/operational factors. Three different matches were conducted on the Shale IV, well 1 including:
1. All ISIP data points
2. Only the 12 first stages at the toe of the well (to exclude variations in the heal section due to geological factors)
3. Same toe stages at the exception of stage 6, which exhibits an abnormally high ISIP value, possibly caused by a nearby fault As shown in Table 7, the consequences of the points to be included in the match on the results of the ISIP analysis are relatively minor. Nevertheless, the third match including only the 12 toe-most stages, at the exception of stage 6, would be the recommended choice, since the stress escalation mostly occurs during the first stages before reaching a plateau.

TABLE 7

Result of ISIP match for different value sets of Shale IV, well 1

| Match | $\Delta\sigma_{plateau}$ (psi) | Escalation |
|---|---|---|
| All points | 753 | 0.77 |
| 12 toe stages | 779 | 0.85 |
| 12 toe stages w/o outlier | 731 | 0.73 |

A similar process should be conducted in most ISIP analyses to exclude points that may not be relevant, and check for the stability of the ISIP matches for different sets of ISIP stage values.

To help with outliers, the match quality variance and relative variance from the least squares analysis can be used to evaluate the match. These indicators indicate how much the match deviate from the ISIP data in average for each stage, respectively in absolute psi's, or relative to the amount of stress escalation. A relative variance of 20% or less is a good sign that the results of the analysis may be trusted. On the other hand, results should be ignored if the relative variance exceeds 40-50%.

Test 4: Optimizing Fracture Spacing in Multi-Stage Completions

The analysis of ISIPs may also guide the process of decreasing stage and perforation cluster spacing and shed light on the amount of stress needed to overcome the in-situ horizontal stress anisotropy and thus favor the propagation of complex fracture networks, especially in very low permeability matrix rocks. In naturally-fractured formations, spacing the perforation clusters so that a near-isotropic condition is reached may considerably increase the surface area stimulated, hence improving the well productivity. The completion design needed to achieve such goal will depend on the magnitude of in-situ horizontal stress anisotropy, hydraulic fracture height, the spacing between perforation clusters and the number of perforation clusters per stage.

In other formations that experience a strike-slip stress regime, meaning that the overburden stress is the intermediate principal stress ($\sigma_{hmin} < \sigma_v < \sigma_{hmax}$), stress escalation may lead to the formation of horizontal fractures. Contrary to a normal-faulting regime where reaching the intermediate stress tends to improve well productivity, a tendency for horizontal propagation may severely contain height growth, the vertical effectiveness of the stimulation treatment, limit proppant concentration, or worse cause screen-outs. In this context, the goal will be to design the completion to avoid "bumping" into the intermediate stress.

Starting from the results of ISIP analysis the well from FIG. 6, we can start to evaluate how changing the fracture spacing would impact the stress induced by the completion. Now that we know the hydraulic fracture height ($2h_f$=242 feet), it is possible to calculate the stress correction factor $\Phi$ for various combinations of perforation cluster spacing and number of perforation cluster spacing/stage using EQU. 6. For instance, in a 25-feet cluster spacing and 5 perforation clusters/stage scenario, the correction factor would be equal to 0.992, 0.944, 0.854, 0.741, and 0.629 for each of the perforation cluster, for an average stage value of 0.832.

Figure 10:
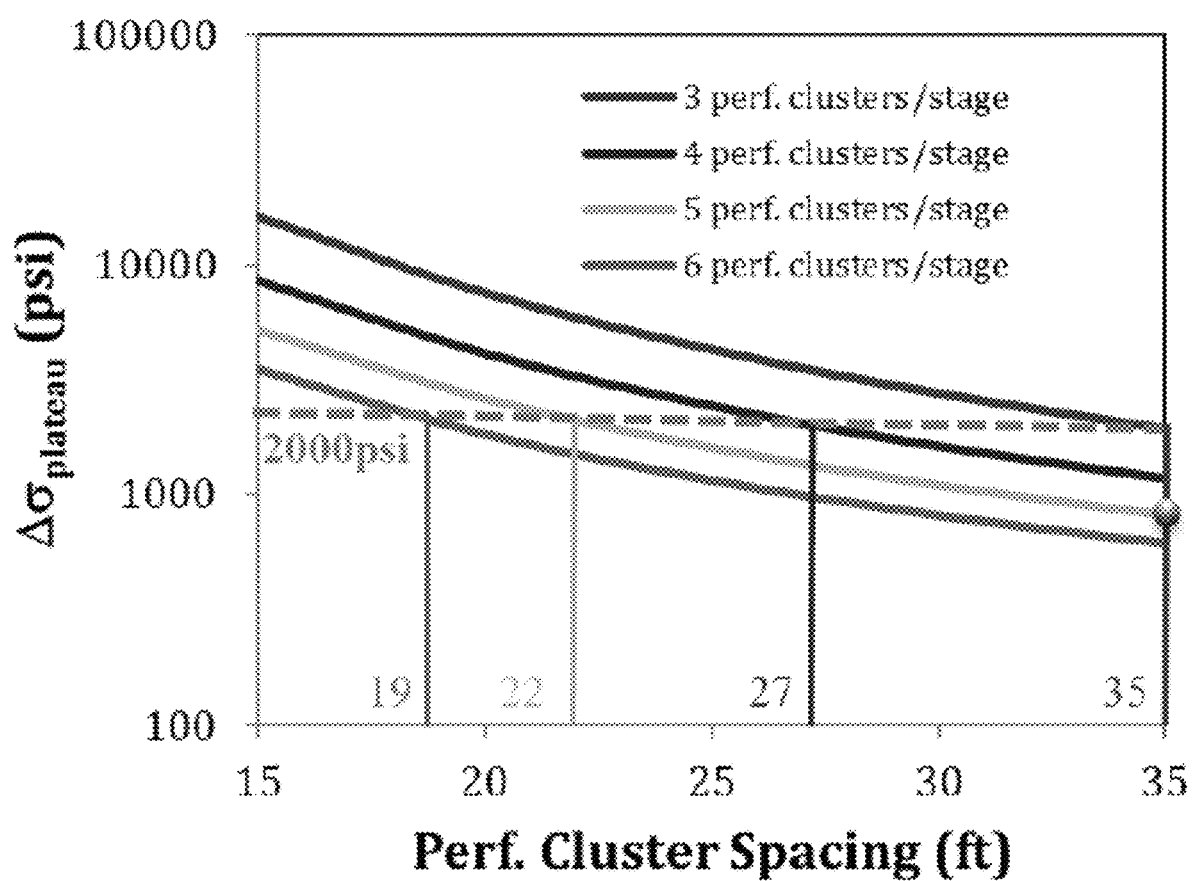
FIG. 10 provides the optimization of perforation cluster and stage spacing for the Shale I formation.

Assuming an unchanged stress load ($\sigma_{load}$=320 psi) and using EQU. 4, the total stress induced by the completion would be equal to 1585 psi. The same process was repeated for many different perforation cluster and stage spacing combinations and the results are shown in FIG. 10. The initial configuration of well A is indicated by the grey point. We assume a hypothetical scenario where the stress induced by the completion should stay below 2000 psi to not overcome the overburden stress. With 3 perforation clusters/stage, the perforation cluster spacing would have to be 35 feet or higher. With 4 perforation clusters/stage, cluster spacing could be reduced down to 27 feet, and to 22 feet and 19 feet respectively for 5 and 6 perforation clusters.

The following references are incorporated by reference in their entirety.

US20120324462 Virtual flow pipelining processing architecture

U.S. Pat. No. 10,753,181 Methods for shut-in pressure escalation analysis

The invention claimed is:

1. A method for fracturing a reservoir, comprising:
   a. obtaining an instantaneous shut-in pressure (ISIP) in a well in a reservoir after each of n stages of a diagnostic fracture injection test (DFIT), said DFIT comprising injecting a volume of fluid at a low rate through perforations in a cemented casing to create a small-scale hydraulic fracture, thereby obtaining ISIP data for each of said n stages of said DFIT;
   b. inputting said ISIP data into a spreadsheet software stored in a non-transitory memory of a computer;
   c. comparing said ISIP data for each of said n stages with a two-parameter exponential recovery equation against type-curves to estimate hydraulic-fracture height and to estimate horizontal-stress anisotropy, wherein said type-curves include load normalized stress plateau type curves, escalation type curves, and interference ratio type curves;
   d. inputting said estimated horizontal-stress anisotropy and said estimated hydraulic-fracture height into a reservoir model software;
   e. optimizing a reservoir fracturing plan using said reservoir model software to obtain an optimized reservoir fracturing plan;
   f. implementing said optimized reservoir fracturing plan to fracture said well or an other well in said reservoir; and,
   g. producing oil from said well or said other well.

2. The method of claim 1, wherein ISIP is a pressure value past an early rapid falloff as determined by extrapolating a slope at an end of a pressure pulse caused by shut-in.

3. The method of claim 2, wherein in step c) fracture height, fracture length, and fracture area are also estimated.

4. The method of claim 3, wherein said ISIP is measured at the surface, downhole, or both.

5. The method of claim 3, wherein if a stress load is less than half a net-pressure at shut-in, fracture reorientation is limited, and said method may proceed, but if not, said method is discontinued.

6. The method of claim 3, wherein said optimized fracturing plan uses one or more modified parameter(s) selected from the group consisting of: cluster number per stage, cluster spacing, stage spacing, fracturing pressure, fracturing fluid type, fracturing fluid volume, fracturing fluid viscosity, proppant type, proppant mass, proppant concentration, pumping rate, pumping schedule or combinations thereof.

7. The method of claim 2, wherein said ISIP is measured at the surface, downhole, or both.

8. The method of claim 2, wherein if a stress load is less than half a net-pressure at shut-in, fracture reorientation is limited, and said method may proceed, but if not, said method is discontinued.

9. The method of claim 2, wherein said optimized fracturing plan uses one or more modified parameter(s) selected from the group consisting of: cluster number per stage, cluster spacing, stage spacing, fracturing pressure, fracturing fluid type, fracturing fluid volume, fracturing fluid viscosity, proppant type, proppant mass, proppant concentration, pumping rate, pumping schedule or combinations thereof.

10. The method of claim 1, wherein in step c) fracture length, and fracture area are also estimated.

11. The method of claim 1 wherein said ISIP is measured at the surface, downhole, or both.

12. The method of claim 1, wherein if a stress load is less than half a net-pressure at shut-in, fracture reorientation is limited, and said method may proceed, but if not, said method is discontinued.

13. The method of claim 1, wherein said optimized fracturing plan uses one or more modified parameter(s) selected from the group consisting of: cluster number per stage, cluster spacing, stage spacing, fracturing pressure, fracturing fluid type, fracturing fluid volume, fracturing fluid viscosity, proppant type, proppant mass, proppant concentration, pumping rate, pumping schedule or combinations thereof.

14. A method for fracturing a reservoir, comprising:
   a. obtaining an instantaneous shut-in pressure (ISIP) in a well in a reservoir after each of n stages of a diagnostic fracture injection test (DFIT), wherein said ISIP is a pressure value past an early rapid falloff as determined by extrapolating a slope at an end of a pressure pulse caused by shut-in, and wherein said DFIT comprises injecting a volume of fluid at a low rate through perforations in a cemented casing to create a small-scale hydraulic fracture, thereby obtaining ISIP data for each of said n stages of said DFIT;
   b. inputting said ISIP data into a spreadsheet software stored in a non-transitory memory of a computer;
   c. comparing said ISIP data for each of said n stages with a two-parameter exponential recovery equation against type-curves to estimate fracture height, fracture length, fracture area, and to estimate horizontal-stress anisotropy;

d. inputting said estimated fracture height, fracture length, fracture area, and said estimated horizontal-stress anisotropy into a reservoir model software;

e. optimizing a reservoir fracturing plan using said reservoir model software to obtain an optimized reservoir fracturing plan;

f. implementing said optimized reservoir fracturing plan to fracture said well or an other well in said reservoir; and, g. producing oil from said well or said other well.

15. The method of claim 14, wherein said type-curves include load normalized stress plateau type curves, escalation type curves, and interference ratio type curves.

16. The method of claim 14, wherein said ISIP is measured at the surface, downhole, or both.

17. The method of claim 14, wherein if a stress load is less than half a net-pressure at shut-in, fracture reorientation is limited, and said method may proceed, but if not, said method is discontinued.

18. The method of claim 14, wherein said optimized fracturing plan uses one or more modified parameter(s) selected from the group consisting of: cluster number per stage, cluster spacing, stage spacing, fracturing pressure, fracturing fluid type, fracturing fluid volume, fracturing fluid viscosity, proppant type, proppant mass, proppant concentration, pumping rate, pumping schedule or combinations thereof.

* * * * *

UNITED STATES PATENT AND TRADEMARK OFFICE
CERTIFICATE OF CORRECTION

PATENT NO.         : 11,727,176 B2
APPLICATION NO.    : 17/672269
DATED              : August 15, 2023
INVENTOR(S)        : Nicolas P. Roussel It is certified that error appears in the above-identified patent and that said Letters Patent is hereby corrected as shown below:

In the Claims

On Column 22, Lines 8 and 9 of Claim 3 should read as:
---3. The method of claim 2, wherein step c) fracture length, and fracture area are also estimated.---

Signed and Sealed this
Twelfth Day of September, 2023

Katherine Kelly Vidal
*Director of the United States Patent and Trademark Office*